United States Patent
Claridge et al.

(10) Patent No.: US 11,732,106 B2
(45) Date of Patent: Aug. 22, 2023

(54) SPHERICAL PARTICLES COMPRISING NANOCLAY-FILLED-POLYMER AND METHODS OF PRODUCTION AND USES THEREOF

(71) Applicant: Xerox Corporation, Norwalk, CT (US)

(72) Inventors: Robert Claridge, Kitchener (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/388,861

(22) Filed: Jul. 29, 2021

(65) Prior Publication Data
US 2023/0051250 A1 Feb. 16, 2023

(51) Int. Cl.
| | | |
|---|---|---|
| *C08J 3/12* | (2006.01) | |
| *B29B 9/10* | (2006.01) | |
| *B29B 9/16* | (2006.01) | |
| *B33Y 70/00* | (2020.01) | |
| *C08K 3/34* | (2006.01) | |
| *B33Y 10/00* | (2015.01) | |
| *B29C 64/314* | (2017.01) | |
| *B29C 64/153* | (2017.01) | |
| *B33Y 40/10* | (2020.01) | |
| *B29K 503/08* | (2006.01) | |

(52) U.S. Cl.
CPC .............. *C08K 3/346* (2013.01); *B29B 9/10* (2013.01); *B29C 64/153* (2017.08); *B29C 64/314* (2017.08); *B33Y 10/00* (2014.12); *B33Y 40/10* (2020.01); *B33Y 70/00* (2014.12); *C08J 3/12* (2013.01); *B29B 2009/166* (2013.01); *B29K 2503/08* (2013.01)

(58) Field of Classification Search
CPC ........ B29B 2009/166; B29B 9/10; C08J 3/12; C08J 3/124; C08J 3/126
See application file for complete search history.

(56) References Cited

U.S. PATENT DOCUMENTS

| | | | | |
|---|---|---|---|---|
| 3,229,002 | A * | 1/1966 | Feder | B29B 9/16 528/502 F |
| 3,505,434 | A * | 4/1970 | Battaerd | C08J 3/12 264/15 |
| 4,863,646 | A * | 9/1989 | Watanabe | C08J 3/12 264/9 |
| 9,777,134 | B2 | 10/2017 | Uenlue et al. | |
| 2017/0129177 | A1 | 5/2017 | Hattig et al. | |
| 2022/0250283 | A1* | 8/2022 | Bauder | B33Y 80/00 |
| 2022/0372236 | A1* | 11/2022 | Morfin | C08L 77/02 |

FOREIGN PATENT DOCUMENTS

| | | |
|---|---|---|
| EP | 3789442 A1 | 3/2021 |
| EP | 3839111 A1 | 6/2021 |

OTHER PUBLICATIONS

Polymers 2019, 11(6), 956.
Chemical Reviews 2017 117 (15), 10212-10290.
J Appl Polym Sci 86: 1497-1506, 2002.
Polymer, 46 (2005) 3275-3288.
Polymer, 46 (2005) 5183-5193.
Materials Science and Eng. C 29 (2009) 474-478.
J. Vinyl Addit. Technol., 23:E72-E80, 2017.
Progress in Polymer Science 35 (2010): 902-958.
Polymer Degradation and Stability 97 (2012) 2594-2601.
Progress in Polymer Science 37 (2012) 406-444.
International Journal of Polymer Science (2013) Article ID 690675.
Eur. Polym. J. 2010, 46, 838-853.
Eur. Polym. J. 2003, 39, 1641-1646.
J. Appl. Polym. Sci. 2007, 103, 3547-3552.
Polymer 2009, 50, 3739-3746.
J. Vinyl Addit. Technol. 2009, 15, 77-86.
Compos. Part B Eng. 2017, 110, 83-95.
Compos. Part B Eng. 2004, 35, 111-124.
Polymer Testing. 51 (2016) 165-173.
Polymer 2008, 49: 5113-5118.
Polym Degrad Stab 2007, 92, 1753-1762.
Polymer 2003, 44, 2761-2772.
Extended European Search Report from corresponding EP Application No. 22184852 dated Dec. 23, 2022.
Yan, C.Z., Shi, Y.S., Yang, J.S. and Liu, J.H. (2011), "An organically modified montmorillonite/nylon-12 composite powder for selective laser sintering", Rapid Prototyping Journal, vol. 17 No. 1, pp. 28-36.
Touchaleaume, Francois & Soulestin, Jérémie & Sclavons, Michel & Devaux, Jacques & Cordenier, François & Van Velthem, Pascal & Flat, J. & Lacrampe, Marie France & Krawczak, Patricia. (2010). Efficient one-step melt-compounding of copolyetheramide/pristine clay nanocomposites using water-injection as intercalating/exfoliating aid. XPRESS Polymer Letters. 5. 1085-1101.

\* cited by examiner (Continued)

*Primary Examiner* — Mary Lynn F Theisen
(74) *Attorney, Agent, or Firm* — Vorys, Sater, Seymour and Pease LLP

(57) ABSTRACT

Methods for producing highly spherical particles that comprise: mixing a mixture comprising: (a) nanoclay-filled-polymer composite comprising a nanoclay dispersed in a thermoplastic polymer, (b) a carrier fluid that is immiscible with the thermoplastic polymer of the nanoclay-filled-polymer composite, optionally (c) a thermoplastic polymer not filled with a nanoclay, and optionally (d) an emulsion stabilizer at a temperature at or greater than a melting point or softening temperature of the thermoplastic polymer of the nanoclay-filled-polymer and the thermoplastic polymer, when included, to disperse the nanoclay-filled-polymer composite in the carrier fluid; cooling the mixture to below the melting point or softening temperature to form nanoclay-filled-polymer particles; and separating the nanoclay-filled-polymer particles from the carrier fluid.

16 Claims, 15 Drawing Sheets

SPHERICAL PARTICLES COMPRISING NANOCLAY-FILLED-POLYMER AND METHODS OF PRODUCTION AND USES THEREOF

FIELD

The present disclosure relates to highly spherical particles that comprises nanoclay-filled-polymer. The present disclosure further relates to compositions, synthesis methods, and applications of such particles.

BACKGROUND

Thermoplastic polymers are often used to make extruded objects like films, bags, particles, and filaments. One example of a thermoplastic polymer is a polyurethane. Polyurethanes have the ability to withstand elevated or low temperatures without loss of physical properties. Polyurethanes are high performance elastomeric materials that combine the flexibility of rubber with toughness and durability.

Polyurethanes have multiple applications in automotive (e.g., seats, armrests, headrests, glaze windshields and windows), medicine (e.g., catheter, general purpose tubing, hospital bedding, surgical drapes, wound dressings, injection molded devices medical implants, medical devices), adhesives, sealants, filters, footwear components, wire sheaths, protective apparel, computer components, aerospace components and parts. Thermoplastic elastomers are copolymers with crystalline "hard" segments and amorphous "soft" segments. Polyurethanes are thermoplastic elastomers typically prepared by the polymerization of isocyanates, polyols, and chain extenders. The soft segments are typically polyols with a low glass transition temperature which impart flexibility to the polymer material. The hard segments are typically urethanes with chain extenders which provide toughness.

Therefore, objects formed with thermoplastic polymers such as the polyurethanes can be used in demanding applications like power tools, automotive parts, gears, and appliance parts. Three-dimensional (3-D) printing, also known as additive manufacturing, is increasingly used to produce such objects. Selective laser sintering has enabled the direct manufacture of three-dimensional objects of high resolution and dimensional accuracy from a variety of materials including polystyrene, nylon, other plastics, and composite materials, such as polymer coated metals and ceramics.

Polyurethane is one of the most common polymers used in additive manufacturing because of its flow properties, lower cost than other polymers, and desirable sintering window. However, physical properties needed in objects produced by additive manufacturing may be beyond those of a polyurethane.

Clay nanofillers, also known as nanoclays, have become a common additive for increasing the mechanical properties of polymer composites like polyurethane composites. Nanoclays possess a characteristic platelet form, flaky soft structure, low specific gravity, lightweight, and high aspect ratio with nanoscale thickness. Incorporation of nanoclays into the polymers is crucial for improving the physical and mechanical properties of the polymer composites. The poor physical interaction between polymers and nanoclay typically leads to poor mechanical and thermal properties. There remains the need for improved nanoclays dispersion throughout the polymer matrix. Expanding the methods by which nanoclay-filled-polymer composites can be manufactured into objects would further expand the polymer composite industry.

SUMMARY

The present disclosure relates to highly spherical particles that comprises nanoclay-filled-polymer. The present disclosure further relates to compositions, synthesis methods, and applications of such particles.

The present disclosure includes methods that comprise: mixing a mixture comprising: (a) nanoclay-filled-polymer composite comprising a nanoclay dispersed in a thermoplastic polymer, (b) a carrier fluid that is immiscible with the thermoplastic of the nanoclay-filled-polymer composite, optionally (c) a thermoplastic polymer not filled with a nanoclay, and optionally (d) an emulsion stabilizer at a temperature at or greater than a melting point or softening temperature of the thermoplastic polymer of the nanoclay-filled-polymer and the thermoplastic polymer, when included, to disperse the nanoclay-filled-polymer composite in the carrier fluid; cooling the mixture to below the melting point or softening temperature to form nanoclay-filled-polymer particles; and separating the nanoclay-filled-polymer particles from the carrier fluid.

The present disclosure also includes methods that comprise: depositing the nanoclay-filled-polymer particles produced by the foregoing method optionally in combination with thermoplastic polymer particles (preferably of similar size and shape but may be porous or solid) upon a surface (e.g., in layers and/or in a specified shape), and once deposited, heating at least a portion of the nanoclay-filled-polymer particles to promote consolidation thereof and form a consolidated body (or object).

A fourth nonlimiting example embodiment is a composition comprising: nanoclay-filled-polymer particles comprising nanoclay-filled-polymer composite, wherein at least 90 wt % of the nanoclay is dispersed in the thermoplastic polymer as 1 layer to 10 layer particles.

The present disclosure also includes methods that comprise: depositing the nanoclay-filled-polymer particles (wherein at least 90 wt % of the nanoclay is dispersed in the thermoplastic polymer as 1 layer to 10 layer particles) optionally in combination with thermoplastic polymer particles (preferably of similar size and shape but may be porous or solid) upon a surface (e.g., in layers and/or in a specified shape), and once deposited, heating at least a portion of the nanoclay-filled-polymer particles to promote consolidation thereof and form a consolidated body (or object).

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
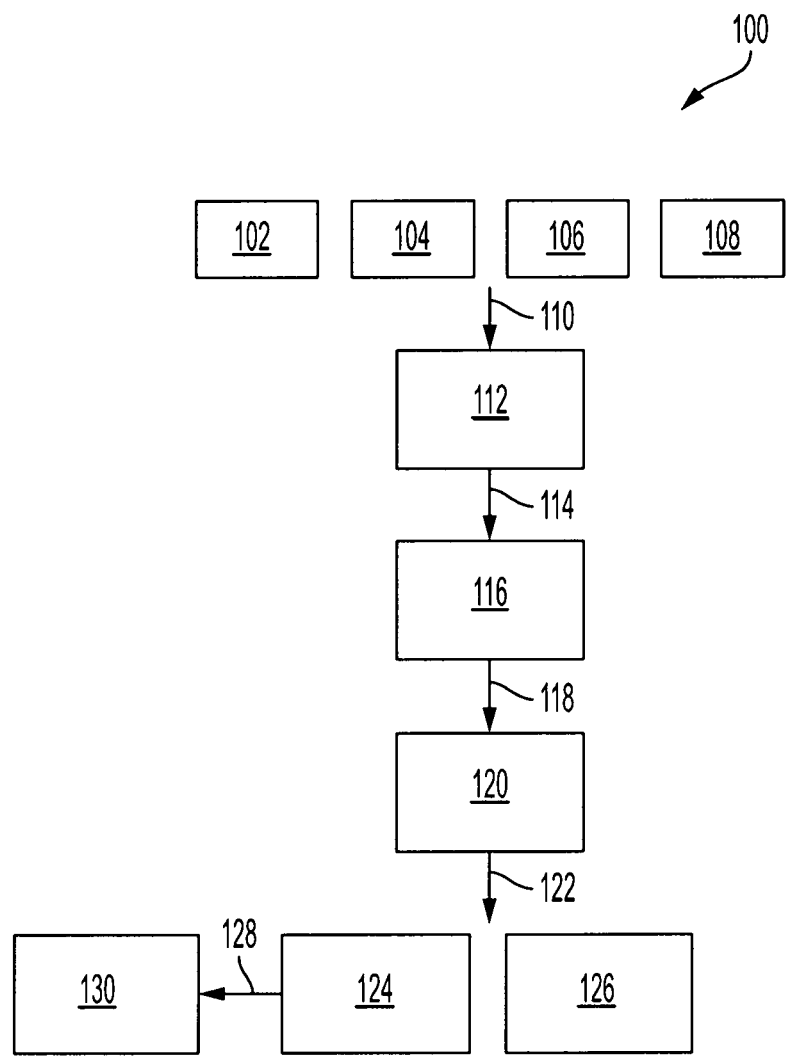
FIG. 1 is a flow chart of a nonlimiting example method of the present disclosure.
Figure 2A:
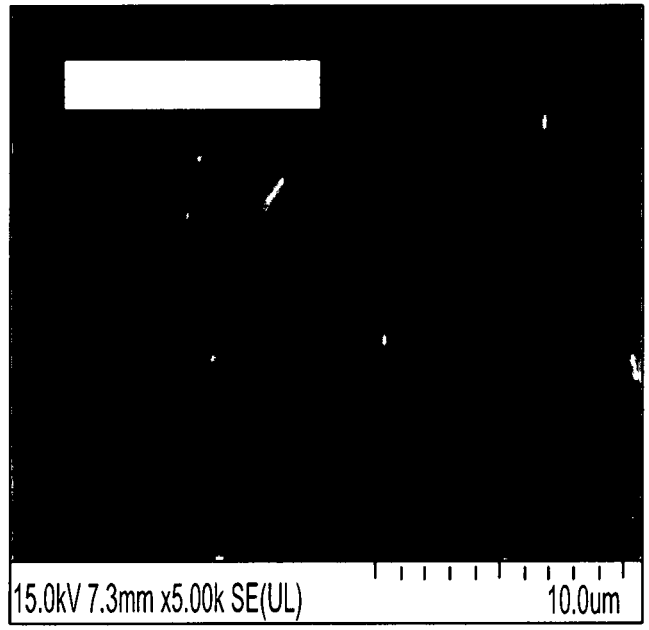
FIGS. 2A-2B, 3A-3B, 4A-4B, 5A-5B, 6A-6B, 7A-7B, and 8A-8B are Scanning Electron Microscope (SEM) cross sectional images of various TPU/nanoclay composites.
Figure 2B:
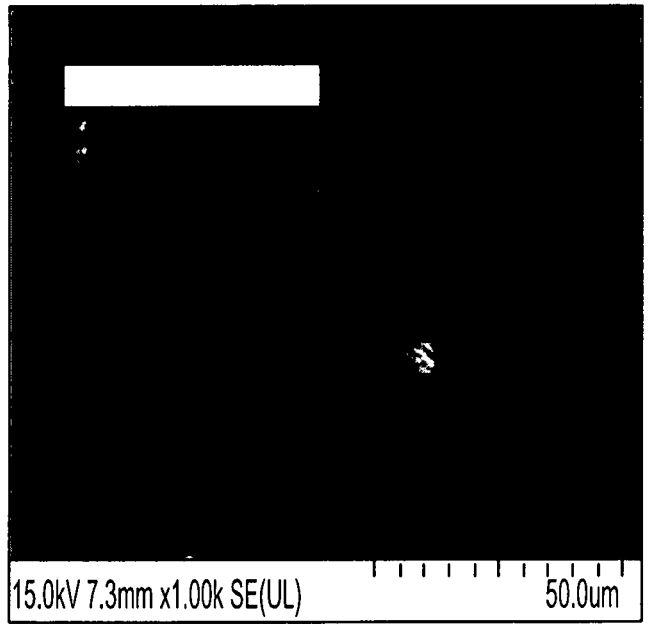
Figure 3A:
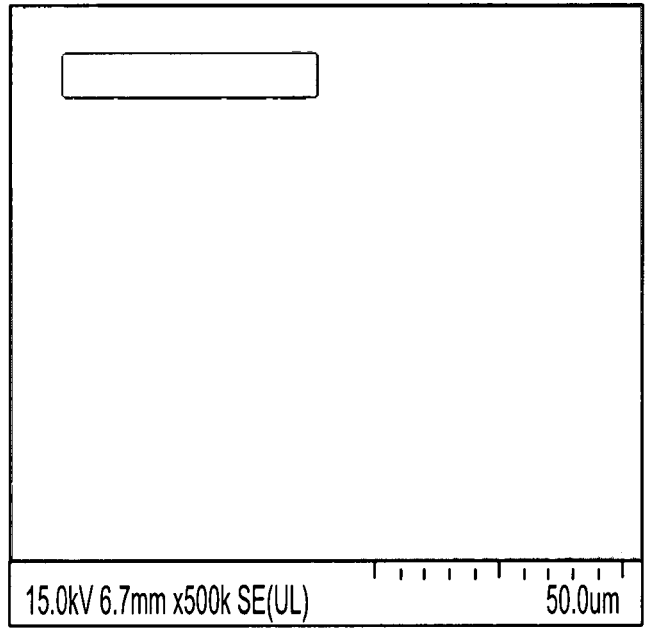
Figure 3B:
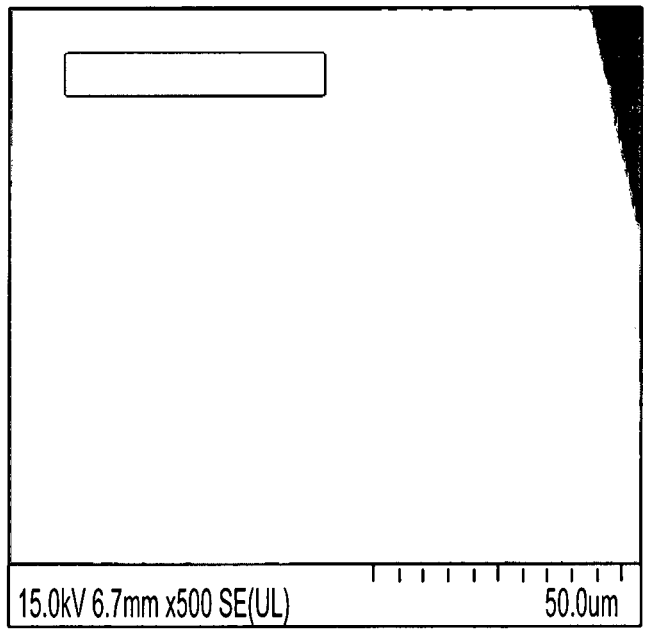
Figure 4A:
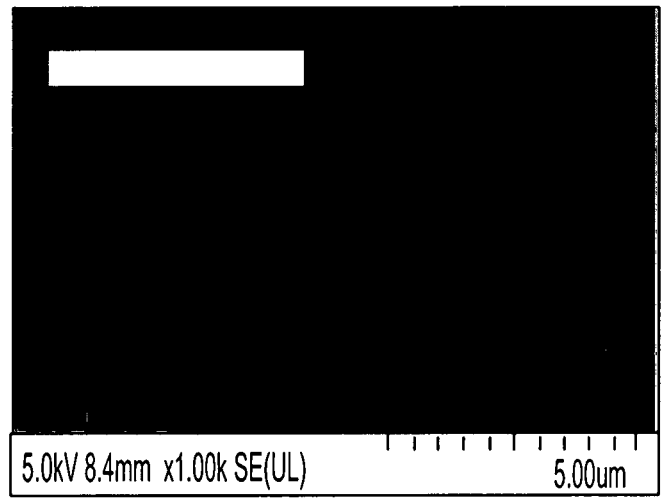
Figure 4B:
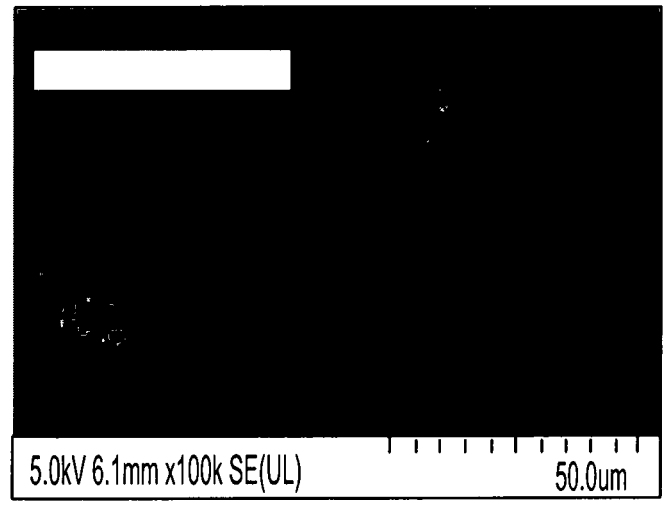
Figure 5A:
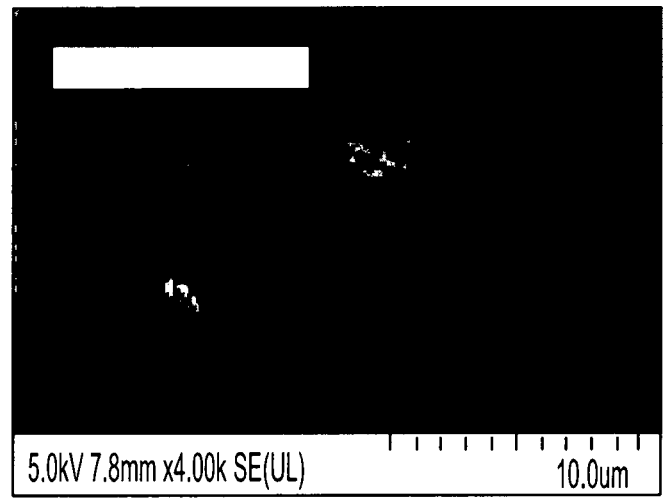
Figure 5B:
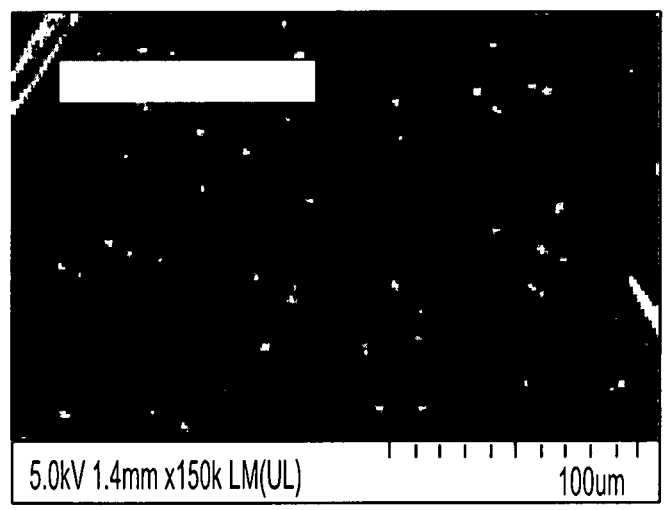
Figure 6A:
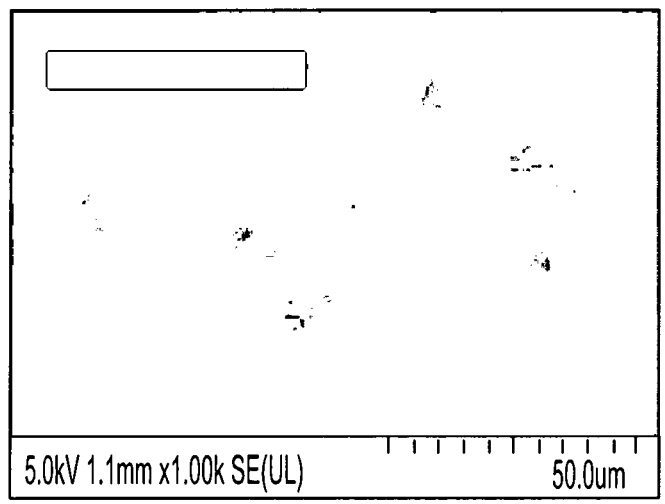
Figure 6B:
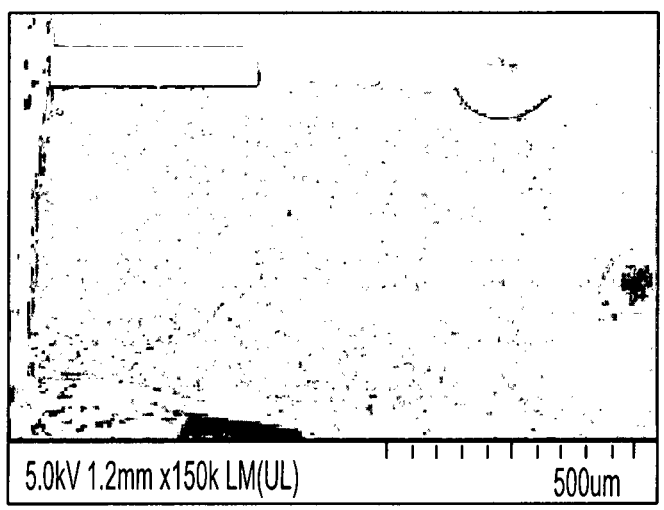
Figure 7A:
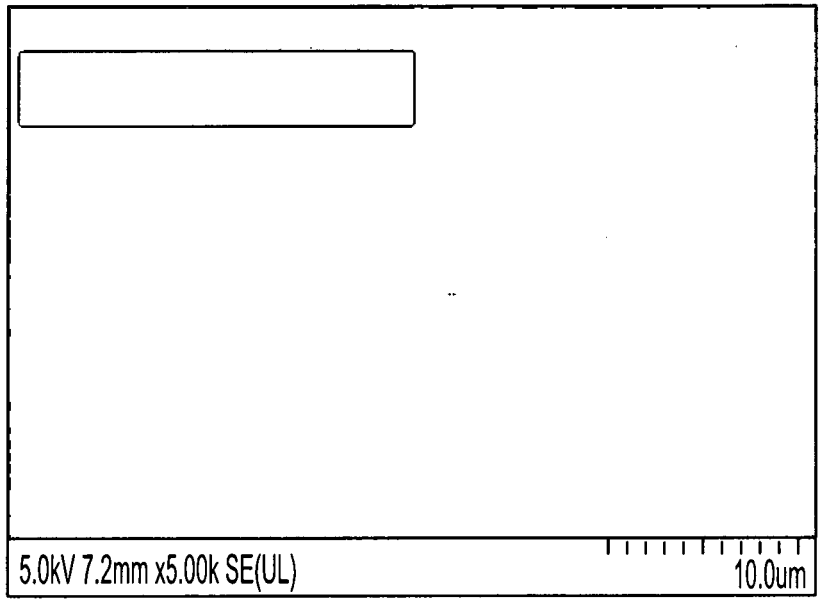
Figure 7B:
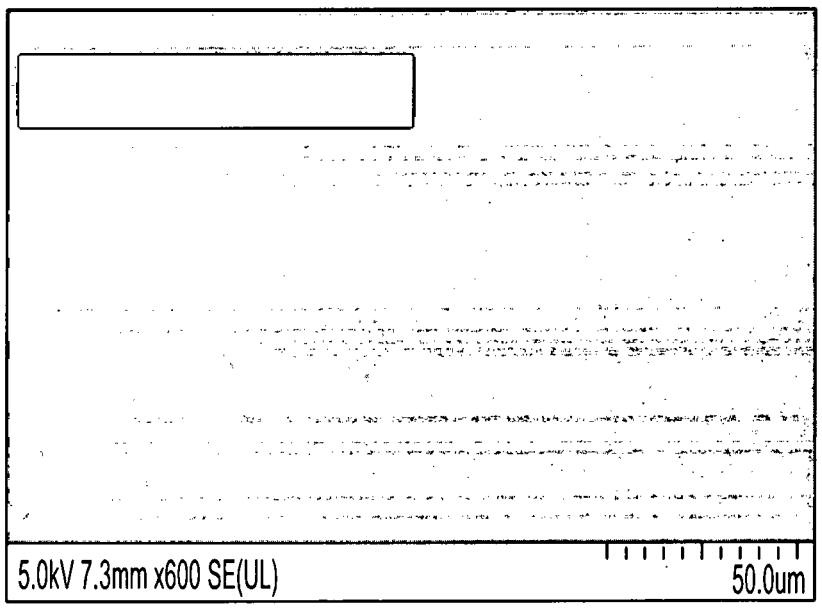
Figure 8A:
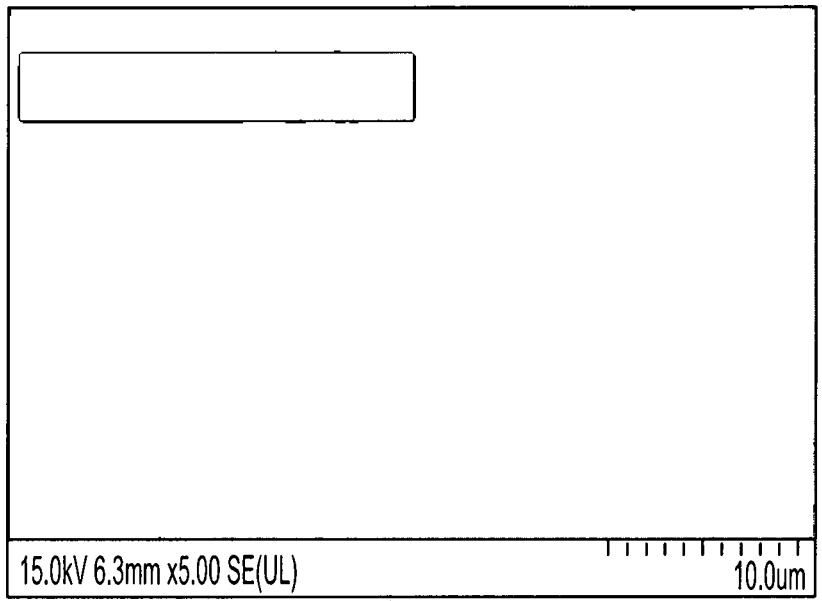
Figure 8B:
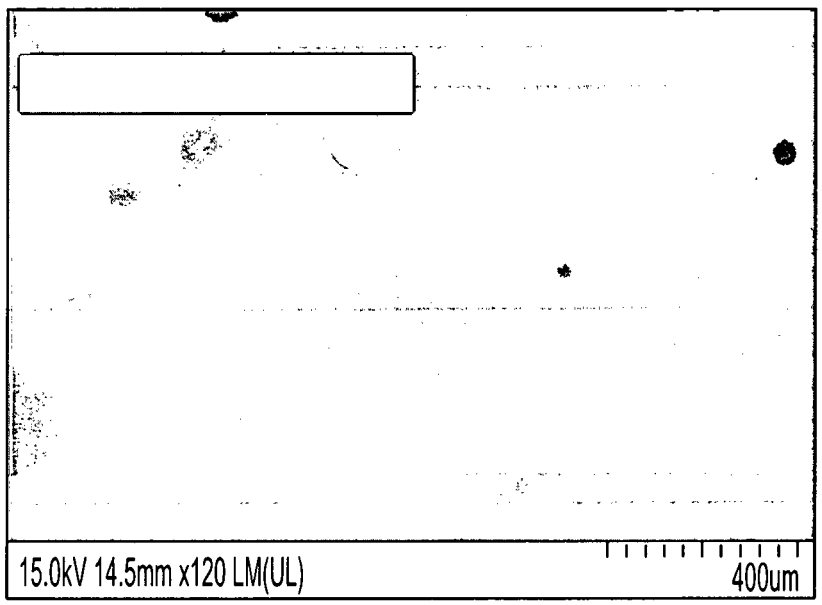
Figure 9A:
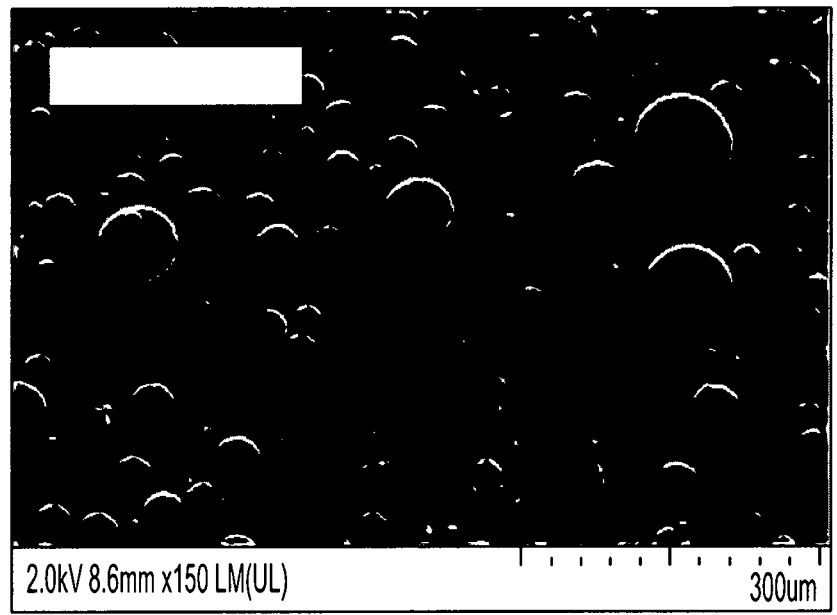
FIGS. 9A-9B, 10A-10B, and 11A-11C are SEM cross sectional images of various TPU/nanoclay compounded particles.
Figure 9B:
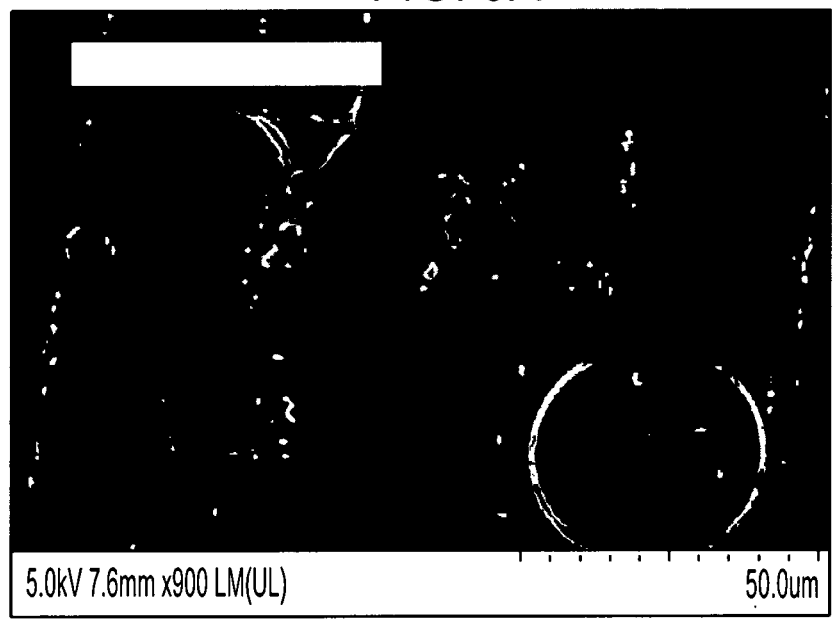
Figure 10A:
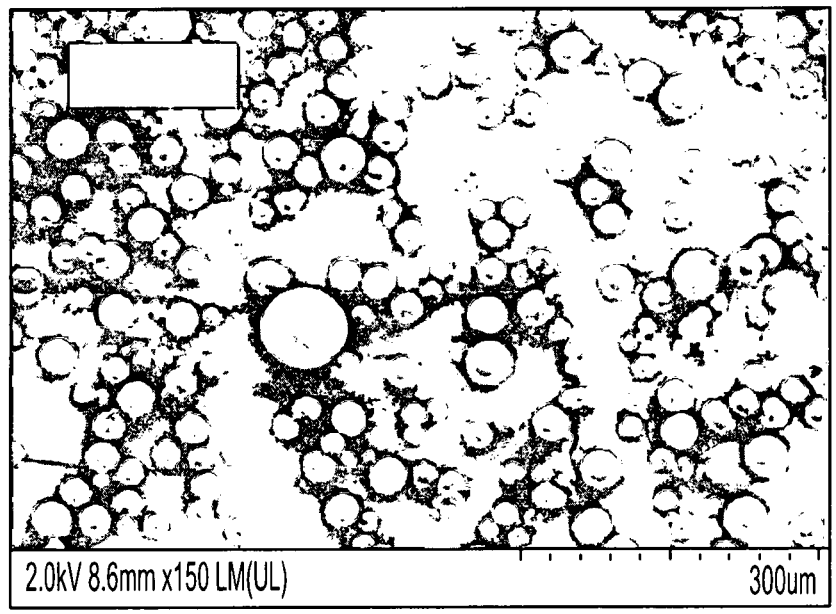
Figure 10B:
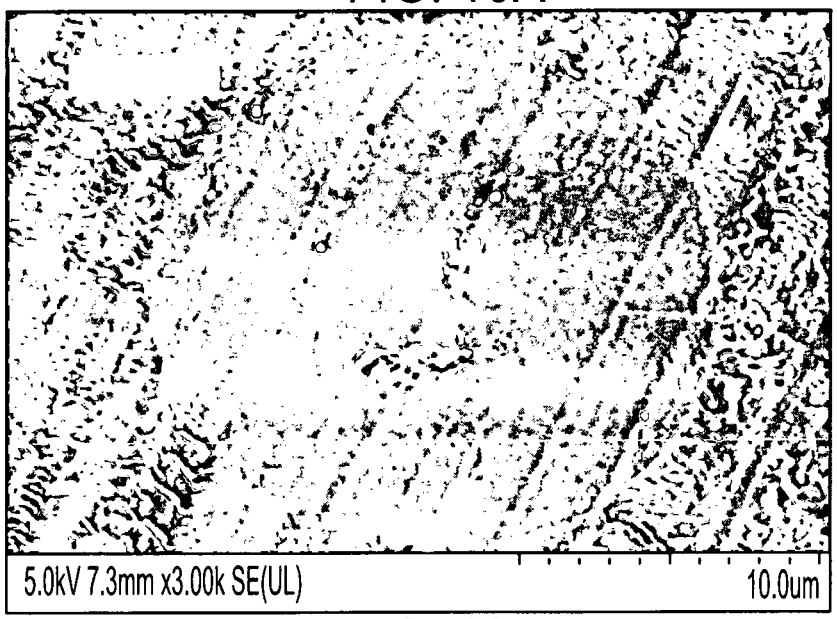

The present disclosure relates to highly spherical particles that comprises nanoclay-filled-polymer. The present disclosure further relates to compositions, synthesis methods, and applications of such nanoclay-filled-polymer particles. The nanoclay-filled-polymers described herein may be, for example, produced by melt mixing methods where nanoclays are well-dispersed throughout the thermoplastic polymers. Because the thermoplastic polymers are filled with the nanoclays, objects that incorporate the nanoclay-filled-polymer will have a more evenly dispersed nanoclay.

More specifically, the present disclosure includes methods of making highly spherical polymer particles comprising nanoclay-filled-polymer that may be useful, among other things, as starting material for additive manufacturing. The melt emulsification methods described herein may advantageously maintain a good dispersion of the nanoclay in the thermoplastic polymer, which may translate to better properties in objects produced from the polymer particles comprising the nanoclay-filled-polymer.

Advantageously, the compositions and methods of the present disclosure provide highly uniformed and spherical particles suitable for 3-D printing and other manufacturing application, with better particle size distribution and improved flow properties when compared to polymer particles made by other methods like cryo-milling. Furthermore, when compared to polymer particles made without any nanoclay-filled-polymers, the compositions of the present disclosure may display increased mechanical properties (e.g., tensile strength, elongation at break), increased thermal stability, improved flame resistance, improved solvent resistance (or improved chemical resistance), and/or improved gas barrier properties (e.g., allowing less oxygen and other gases to permeate). Further, one or more of said properties may be achieved with little to no particle size classification (e.g., sieving) and/or low loading of nanoclays. Accordingly, the production of lighter weight articles by additive manufacturing where said articles have improved properties (e.g., flame retardance, chemical resistance, and/or less gas permeability) may be achieved.

Definitions and Test Methods

Numerical ranges used herein include the numbers recited in the range. For example, the numerical range "from 1 wt % to 10 wt %" includes 1 wt % and 10 wt % within the recited range.

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

When referring to a polymer in terms of the -mer units, it would be understood by one skilled in the art that the -mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane monomer(s)" refers to a monomer(s) that form a polyurethane. As used herein, the term "polyurethane" refers to a polymeric reaction product between a diisocyanate, a polyol, and an optional chain extender.

As used herein, the term "nanoclay" refers to a fine-grained natural rock or soil material made up of layered silicates or clay minerals with traces of metal oxides and organic matter. Clay minerals have crystalline form and are hydrous aluminum phyllosilicates, sometimes with variable amounts of metals such as iron, magnesium, lithium, alkali metals, alkaline earths, and other cations. The microstructure of clays is often observed in a platelet fashion having less than 2 μm in diameter and less than 10 nm in thickness. Additionally, each layer comprises at least one silica ($SiO_2$) tetrahedron (T) followed by one alumina ($Al_2O_3$) octahedron (O). The number of tetrahedron (T) and octahedron (O) units may differ between clays. Clays are often categorized on the basis of their crystal architecture as well as the amount and location of a charge within a basic cell, cation exchange capacity (CEC), the ratio of T and O units, interlayer space (d-space) and morphology.

As used herein, the terms "nanoclay-filled-polymer" refer to a nanoclay incorporated into a thermoplastic polymer therefrom by any suitable incorporation/filling method (e.g., intercalation; flocculation; exfoliation). These terms do not imply the method by which the structure is produced but rather describe the structure itself.

As used herein, the term "oxide" refers to both metal oxides and non-metal oxides. For purposes of the present disclosure, silicon is considered to be a metal.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90-D10)/D50.

Particle diameters and particle size distributions are determined by light scattering techniques using a Malvern MASTERSIZER™ 3000. For light scattering techniques, the control samples were glass beads with a diameter within the range of 15 μM to 150 μM under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Mw is the weight-average molecular weight. Unless otherwise noted, Mw has units of g/mol or kDa (1,000 g/mol=1 kDa) and is measured by gel permeation chromatography.

The melt flow index (MFI) is the measure of resistance to flow of polymer melt under defined set of conditions (unit: g/10 min) and is measured by ASTM 1238-20 Standard Procedure A at 195° C. using a 2 mm orifice and a 2.16 kg load. Being a measure at low shear rate condition, MFI is inversely related to molecular weight of the polymer.

As used herein, "tensile modulus" (MPa) of a solid material is a mechanical property that measures its stiffness. It is defined as the ratio of its tensile stress (force per unit area) to its strain (relative deformation) when undergoing elastic deformation. It can be expressed in Pascals or pounds per square inch (psi). ASTM D638-14 can be used to determine tensile modulus of a polymer.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho_{aer}$) is measured per ASTM D6393-14.
Bulk density ($\rho_{bulk}$) is measured per ASTM D6393-14.
Tapped density ($\rho_{tap}$) is measured per ASTM D6393-14.
Hausner ratio ($H_r$) is a measure of the flowability of a powder and is calculated by $H_r=\rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning calorimetry (DSC). DSC provides a rapid method for determining polymer crystallinity based on the heat required to melt the polymer. The crystallization temperature (° C.) is measured according to ASTM E794-06(2018) with 10° C./min ramping and cooling rates where the crystallization temperature is determined based on the second heating and cooling cycle.

The crystallinity (%) of a polymer, unless otherwise specified, is determined by ASTM D3418-15. For crystallinity calculations, a 100% crystalline TPU is considered to have an enthalpy of 196.8 J/g.

Herein Young's modulus, tensile, and elongation at break are measured according to ASTM D412-16e1 using an Instron Frame 3367, 2 kN load cell, Type 5 dogbones, and 50 mm/s testing rate.

Herein flexural modulus is measured according to ASTM D790-17 using an Instron Frame 3367, 2 kN load cell, and a 3 point bend.

The dimensional accuracy of SLS part (%) is a quantitative measure of the accuracy of a 3D printed sintered parts of SLS.

Nanoclay-Filled-Polymer

Generally, the compositions, synthesis methods, and application methods of the present disclosure use natural or synthetically modified nanoclays that are dispersed throughout the thermoplastic polymers. Herein when describing nanoclays as being dispersed in a thermoplastic polymer, at least 90 wt % of the nanoclay is dispersed in the thermoplastic polymer as 1 layer to 10 layer particles. Without being limited by theory, it is believed that exfoliation of clay layers and/or dispersion of the clay in a small number of layers improves the mechanical properties of the nanoclay-filled-polymer, and ultimately, the objects produced therefrom (e.g., 3-D printed articles produced from nanoclay-filled-polymer particles.)

Dispersion of the nanoclays throughout the thermoplastic polymer may be carried out via melt mixing. The result is a nanoclay-filled-polymer. Because of the chemical nature of the nanoclays and the method used to disperse the nanoclay to form the nanoclay-filled-polymer composite, the well-dispersed nanoclays in the thermoplastic polymers can act as effective nucleating agents that increase the rate of crystallization of the thermoplastic polymers.

Nanoclay-filled-polymer compositions of the present disclosure may include one or more nanoclays and one or more thermoplastic polymers. Production of said nanoclay-filled-polymer compositions may be by melt mixing methods to produce highly dispersed nanoclay in a thermoplastic polymer matrix.

Examples of thermoplastic polymers may include, but are not limited to, polyamides, polyurethanes, polyethylenes (preferably functionalized polyethylenes), polypropylenes (preferably functionalized polypropylenes), polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, polystyrenes, polyvinyl chlorides, polytetrafluoroethenes, polyesters (e.g., polylactic acid), polyethers, polyether sulfones (PESU), polysulfones (PSU), polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyamides, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure. Preferred polymers may be polyolefins (polyethylenes, polypropylenes, and the like), polyamides, polyurethanes, and any combination thereof.

Examples polyamides may include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

The thermoplastic polymers not filled with a nanoclay 108 in the compositions and methods of the present disclosure may be elastomeric or non-elastomeric but preferably not thermoset polymers. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, N.Y., 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Polyurethanes may comprise aliphatic, aromatic, ether, ester, urethane, and urea groups, thus providing a wide range of polarities and hydrogen-bonding possibilities, which may promote miscibility, or at least strong interfacial bonding, with a wide variety of other polymers.

Polyurethanes, herein, may be thermoplastic polyurethanes (TPUs). The e may be composed of a hard segment (e.g., diisocyanate and diol, or diamine), and a soft segment (polyester or polyether macrodiol).

The polyurethanes may be produced from (a) a polyisocyanate component, (b) a polyol component, and (c) an optional chain extender component. The polyisocyanate component may comprise an aromatic diisocyanate. The polyisocyanate component may selected from the group consisting of 4,4'-methylenebis(phenyl isocyanate), toluene diisocyanate, 2,4-toluene diisocyanate, 2,6-toluene diisocyanate, or any combination thereof. The polyol component may be selected from the group consisting of: a polyether polyol, a polyester polyol, a copolymer of polyether and polyester polyols, or any combination thereof. Further, the polyol component may comprise a poly(tetramethylene ether glycol), a polycaprolactone, a polyester adipate, a copolymer thereof, or any combination thereof. The chain extender component may comprise a linear alkylene diol selected from the group consisting of: 1,4-butanediol, 1,12-dodecanediol, dipropylene glycol, or any combination thereof.

Examples of polyurethanes may include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenyl isocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Polyurethanes may be synthesized by a polyaddition reaction of diisocyanates with diols, in presence of an organocatalyst (e.g., an organotin catalyst, an organic tertiary amine combined with organotin catalyst, or N-heterocyclic carbenes (NHCs)). Herein, diisocyanates, polyols, and chain extenders may be used at a molar ratio ranging from about 5:0.1:0.1 to about 1:1:1, such as 1:0.5:0.5, for example (the molar ratio may be modified to obtain different properties); a pre-polymer may be prepared by reacting the diisocyanate (e.g., 4,4'-methylene bis(phenylisocyanate) (MDI)) with the polyol (e.g., polyetherpolyol) at a temperature ranging from about 50° C. to about 120° C. (preferably 80° C.). Solvents, such as organic solvents miscible with the organic reactants used herein (e.g., dimethylformamide (DMF)) may be used herein. Conversion of —OH groups may be monitored/analyzed by titration of NCO groups. A diol (e.g., 1,4-butanediol) and a catalyst (e.g., organotin catalyst such as dibutyltin dilaurate catalyst) may be added to the reaction vessel, enabling the chain extension. The resulting slurry mixture may then be poured into a mold to evaporate the solvent. Any residual solvent may be removed by placing the polymer product in a vacuum oven at a temperature ranging from about 25° C. to about 100° C. (preferably 50° C.).

Compatibilizers may optionally be used to improve the blending efficiency and efficacy of the nanoclay-filled-polymer with one or more thermoplastic polymers not having nanoclay therein. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (co-extrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyurethanes, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

Examples of nanoclays may be natural or synthetically modified nanoclays (e.g., clays organically modified with quaternary ammonium). Examples of nanoclay that may be incorporated to a thermoplastic polymer thereto may include, but are not limited to, laponite, layered double hydroxide, montmorillonite, halloysite, bentonite, and sepiolite, and the like, and any combinations thereof. Montmorillonite consists of about 1 nm thick aluminosilicate layers surface-substituted with metal cations and stacked in about 10 μm-sized multilayer stacks. Nonlimiting examples of nanoclays surface modification may include ionic modifications, covalent and dual modifications (ionic and covalent). Nonlimiting examples of nanoclays may be nanoclays comprising quaternary ammonium such as dimethyl dihydrogenated tallow ammonium compound (M2HT), dimethyl benzyl hydrogenated tallow ammonium (2MBHT), dimethyl hydrogenated tallow 2-ethylhexyl ammonium (2MHTL8), methyl tallow bis-2hydroxy ethyl ammonium (MT2EtOH). Nanoclays of the present disclosure may be selected from the group consisting of nanoclay Shelsite Na+(unmodified clay), nanoclay Shelsite 15A (dimethyl benzyl hydrogenated tallow quaternary ammonium), nanoclay Shelsite 20A (dimethyl benzyl hydrogenated tallow ammonium chloride modified montmorillonite), nanoclay Shelsite 30A (methyl tallow bis-2-hydroxyethyl quaternary ammonium chloride), nanoclay Shelsite 93A (Methyl dehydrogenated tallow ammonium), nanoclay NANOMER® PGV (hydrophilic bentonite), nanoclay kaolin, nanoclay metakaolin, and the like, and any combinations thereof.

The modification of nanoclays with functional groups (e.g., hydroxyl group) may be further reacted with monomer units, oligomers, or directly reacted to a longer polymer chain of some thermoplastic polymers (e.g., polyurethane) to improve the dispersion capabilities of the nanoclays within the polymer matrix. Hence, the functionalized nanoclays may be readily integrated within the polymer matrix to form the corresponding nanoclay-filled-polymer and thermoplastic polymer nanocomposite.

Examples of commercially available nanoclays include, but are not limited to, NANOMER® PGV (cationic nanoclay, hydrophilic bentonite, available from SigmaAldrich) with D50 size of less than 25 microns, NANOMER® 1.34TCN (available from available from SigmaAldrich) with a D50 size of 14-18 microns, kaolin nanoclay (available from Nanoshel LLC) with a D50 size of <80 nm microns, metakaolin (dehydroxylated form of the kaolinite, available from Nanoshel LLC) with a D50 size of 40-50 nm, halloysite (available from SigmaAldrich) with a D50 size of 30-70 nm, nanoclay Shelsite 15A (dimethyl benzyl hydrogenated tallow quaternary ammonium modified montmorillonite, available from Nanoshel LLC) with a D50 size of less than 100 nm, nanoclay Shelsite 20A (dimethyl benzyl hydrogenated tallow ammonium chloride modified montmorillonite, available from Nanoshel LLC) with a D50 size of less than 80 nm, nanoclay Shelsite 30B (methyl tallow bis-2-hydroxyethyl quaternary ammonium chloride modified montmorillonite, available from Nanoshel LLC) with a D50 size of less than 80 nm, nanoclay Shelsite 93A (methyl dehydrogenated tallow ammonium modified montmorillonite, available from Nanoshel LLC) with a D50 size of less than 80 nm, CLOISITE® 20A (phyllosilicates, available from BYK) with a D50 size of less than 10 μm, CLOISITE® 116 (phyllosilicates, available from BYK) with a D50 size of less than 15 μm, CLOISITE® CA++(phyllosilicates, available from BYK) with a D50 size of less than 10 μm, CLOISITE® Na+(phyllosilicates, available from BYK) with a D50 size of less than 25 μm, and the like, and any combination thereof.

Surface of nanoclays may have an average diameter (or D50) of about 10 nm to about 500 microns (or about 20 nm to about 400 microns, or about 30 nm to about 300 microns, or about 50 nm to about 200 microns, or about 1 micron to about 200 microns, or about 1 micron to about 150 microns, or about 5 microns to about 100 microns, or about 10 micron to about 50 microns, or about 25 microns to about 200 microns, or about 100 microns to about 500 microns,).

The way of incorporation of nanoclay into the thermoplastic polymer matrix may affect the physical properties of the nanoclay-filled-polymer. The nanoclay incorporation can be performed by known methods.

A first nonlimiting example synthesis of a nanoclay-filled-polymer may comprise: physically mixing a nanoclay and a thermoplastic polymer via melt mixing, resulting in physical trap forces such as polar, hydrogen bonding and shear between the clay and the thermoplastic polymer. The nanoclay may be incorporated via intercalation, flocculation, and/or exfoliation.

A second nonlimiting example synthesis of a nanoclay-filled-polymer where the thermoplastic polymer comprises polyurethane may comprise: firstly dispersing (e.g., dispersion via ultrasonication) the nanoclay in the isocyanate component of the polyurethane to produce a mixture; mixing the mixture with the polyol component of the polyurethane (Manasa Nayani et al., International Journal of Polymer Science, 2013). Other mixing methods will be apparent to those skilled in the art.

The nanoclay may be incorporated to the thermoplastic polymer via melt mixing with thermoplastic polymer at about 125° C. to about 250° C. (or about 125° C. to about 200° C., or about 150° C. to about 225° C., or about 200° C. to about 250° C.) for about 5 minutes to about 1 hour or longer (or about 10 minutes to about 30 minutes, or about 20 minutes to about 40 minutes, or about 30 minutes to about 1 hour).

In a nonlimiting example, the nanoclay-filled-polymer may be thermoplastic polymer containing hydroxyl-functionalized nanoclay produced from a surface modification of the nanoclay via acid-mediated oxidation of the nanoclay.

The nanoclay-filled-polymers described herein may have a weight ratio of nanoclay to thermoplastic polymer of about 0.1:10 to about 0.1:1000 (or about 0.1:10 to about 0.1:200, or about 0.1:100 to about 0.1:500, or about 0.1:250 to about 0.1:1000, or about 0.5:100 to about 20:100, or about 1:100 to about 15:100, or about 1.5:100 to about 10:100, or about 2:100 to about 5:100).

The nanoclay-filled-polymer may comprises about 80 wt % to about 99.9 wt % (or about 85 wt % to about 95 wt %, or about 85 wt % to about 90 wt %, or about 95 wt % to about 99.9 wt %) of the thermoplastic polymer, and about 0.05 wt % to about 20 wt % (or about 0.1 wt % to about 18 wt %, or about 1 wt % to about 15 wt %, or about 2 wt % to about 10 wt %) of the nanoclay, based on the total weight of the nanoclay-filled-polymer.

Nanoclay-Filled-Polymer Particles and Methods of Making

FIG. 1 is a flow chart of a nonlimiting example method 100 of the present disclosure. Nanoclay-filled-polymer composite 102 (where at least 90 wt % of the nanoclay is dispersed in the thermoplastic polymer as 1 layer to 10 layer particles), carrier fluid 104, optionally emulsion stabilizer 106, and optionally thermoplastic polymer not filled with nanoclays 108 (e.g., the thermoplastic polymer of the nanoclay-filled-polymer 102, a thermoplastic polymer not of the nanoclay-filled-polymer 102, or any combination thereof) are combined 110 to produce a mixture 112. It is noted that referenced numeral 108 refers to the "thermoplastic polymer not filled with a nanoclay."

The polymer of the nanoclay-filled-polymer 102 may be a thermoplastic polymer. The polymer of the nanoclay-filled-polymer 102 may be an elastomeric polymer. The polymer of the nanoclay-filled-polymer 102 may be a non-elastomeric polymer. The polymer of the nanoclay-filled-polymer 102 may be one or more of the specific thermoplastic polymers listed herein (e.g., polyamides, polyurethanes, polyethylenes (preferably functionalized polyethylenes), polypropylenes (preferably functionalized polypropylenes), polyacetals, polycarbonates, PBT, PET, etc.).

The components 102, 104, 106, and 108 can be added individually or in a blend of components in any order and include mixing and/or heating during the process of combining 110 the components 102, 104, 106, and 108. For example, the nanoclay-filled-polymer 102 and the thermoplastic polymer not filled with a nanoclay 108, if included, may be premixed before combining 110. Herein, the thermoplastic polymer of the nanoclay-filled-polymer refers to the thermoplastic polymer if not filled or otherwise blended with a nanoclay.

The mixture 112 may then processed 114 by applying sufficiently high shear to the mixture 112 at a temperature at or greater than the melting point or softening temperature of (a) the thermoplastic polymer of the nanoclay-filled-polymer 102 or (b) thermoplastic polymer not filled with a nanoclay 108, whichever is greater to form a melt emulsion 116. Because the temperature is above the melting point or softening temperature of polymeric portions of the mixture 112 (i.e., the thermoplastic polymer of the nanoclay-filled-polymer 102 and, if included, thermoplastic polymer not filled with a nanoclay 108), a polymer melt forms that comprises the nanoclay-filled-polymer 102 and, if included, thermoplastic polymer not filled with a nanoclay 108. The shear rate should be sufficient enough to disperse the polymer melt (e.g., comprising nanoclay-filled-polymer) in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into nanoclay-filled-polymer particles 124. The term "nanoclay-filled-polymer particles" refers to polymer particles comprising the nanoclay-filled-polymer 102 and may include other components in the polymer particles (e.g., the thermoplastic polymer not filled with a nanoclay 108).

The cooled mixture 120 can then be treated 122 to isolate the nanoclay-filled-polymer particles 124 (where at least 90 wt % of the nanoclay is dispersed in the thermoplastic polymer as 1 layer to 10 layer particles) from other components 126 (e.g., the carrier fluid 104, excess emulsion stabilizer 106, and the like) and wash or otherwise purify the nanoclay-filled-polymer particles 124. The nanoclay-filled-polymer particles 124 comprise the nanoclay-filled-polymer 102 and the thermoplastic polymer not filled with a nanoclay 108, when included, and at least a portion of the emulsion stabilizer 106, when included, coating the outer surface of the nanoclay-filled-polymer particles 124. Emulsion stabilizers 106, or a portion thereof, may be deposited as coating, perhaps a uniform coating, on the nanoclay-filled-polymer particles 124. In some instances, which may be dependent upon non-limiting factors such as the temperature (including cooling rate), the type of nanoclay-filled-polymer 102, and the types and sizes of emulsion stabilizers 106, the nanoparticles of emulsion stabilizers 106 may become at least partially embedded within the outer surface of nanoclay-filled-polymer particles 124. Even without embedment taking place, at least a portion of the nanoparticles within emulsion stabilizers 106 may remain robustly associated with nanoclay-filled-polymer particles 124 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The nanoclay-filled-polymer particles 124 may optionally be further purified 128 (described in more detail below) to yield purified nanoclay-filled-polymer 130.

The carrier fluid 104 should be chosen such that at the various processing temperatures (e.g., from room temperature to process temperature) the nanoclay-filled-polymer 102 and the carrier fluid 104 are immiscible. An additional factor that may be considered is the differences in (e.g., a difference or a ratio of) viscosity at process temperature between the nanoclay-filled-polymer 102 and the carrier fluid 104. The differences in viscosity may affect droplet breakup and particle size distribution.

The nanoclay-filled-polymer 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the nanoclay-filled-polymer 102, the thermoplastic polymers not filled with a nanoclay 108, and the carrier fluid 104 combined. When the thermoplastic polymers not filled with a nanoclay 108 is included, nanoclay-filled-polymer 102 and the thermoplastic polymers not filled with a nanoclay 108 combined may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the nanoclay-filled-polymer 102, the thermoplastic polymers not filled with a nanoclay 108, and the carrier fluid 104 combined. When include, the weight ratio of the nanoclay-filled-polymer 102 to the thermoplastic polymers not filled with a nanoclay 108 may be about 10:90 to about 99.9:0.1 (or about 10:90 to about 50:50, or about 25:75 to about 75:25, or about 50:50 to about 99:1, or about 80:20 to about 99.9:0.1).

Examples of thermoplastic polymers not filled with a nanoclay 108 may include those described above (e.g., polyamides, polyurethanes, polyethylenes (preferably functionalized polyethylenes), polypropylenes (preferably functionalized polypropylenes), polyacetals, polycarbonates, PBT, PET, etc.). Further, the compatibilizers described above may be included in the mixture 112. For example, non-polar polymer blends (e.g., polymer blends of TPU and various thermoplastic polymers, such as polyacetal, polyamide 6, poly(vinyl chloride), poly(vinyl butyral), polycarbonate, polypropylene, and polyethylene) may be achievable by using a compatibilizing agent. TPU itself may be tuned via soft and hard segments in order to increase its compatibility or miscibility with other polymers (e.g., poly(styrene-b-4-vinylpyridine) diblock copolymer as a compatibilizer).

The thermoplastic polymer of the nanoclay-filled-polymer 102 and/or the thermoplastic polymer not filled with a nanoclay 108 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.). In some instances, the thermoplastic polymer of the nanoclay-filled-polymer 102 and/or the thermoplastic polymer not filled with a nanoclay 108 may have a melting point or softening temperature of about 150° C. to about 170° C.

The thermoplastic polymer of the nanoclay-filled-polymer 102 and/or the thermoplastic polymer not filled with a nanoclay 108 may have a glass transition temperature (ASTM E1356-08(2014) with 10° C./min ramping and cooling rates) of about −60° C. to about 100° C. (or about −60° C. to about 0° C., or about −25° C. to about 50° C., or about 0° C. to about 100° C.).

The nanoclay-filled-polymer 102 may have a tensile strength ranging from about 5 MPa to about 200 MPa (or from about 5 MPa to about 150 MPa, or from about 10 MPa to about 100 MPa, or from about 10 MPa to about 50 MPa).

The nanoclay-filled-polymer 102 may have a Young's Modulus ranging from about 5 MPa to about 100 MPa (or from about 10 MPa to about 75 MPa, or from about 20 MPa to about 50 MPa, or from about 30 MPa to about 40 MPa).

The nanoclay-filled-polymer 102 may have an elongation at break (%) ranging from about 100% to about 800% (or from about 250% to about 600%).

The nanoclay-filled-polymer 102 may have a flexural modulus ranging from about 40 MPa to about 100 MPa (or about 50 MPa to about 90 MPa, or about 60 MPa to about 800 MPa).

The nanoclay-filled-polymer 102 may have a flexural strength ranging from about 0.5 MPa to about 20 MPa (or about 1 MPa to about 15 MPa, or about 5 MPa to about 10 MPa).

The nanoclay-filled-polymer 102 may have a Hardness (Shore A) ranging from about 10 to about 200 (or about 20 to about 150, or about 40 to about 100).

The nanoclay-filled-polymer 102 may have a molecular weight (Mw, kDa) ranging from about 10 kDa to about 500 kDa (or about 20 kDa to about 400 kDa, or about 30 kDa to about 300 kDa, or about 40 kDa to about 200 kDa). For example, the nanoclay-filled-polymer 102 may have a molecular weight (Mw) ranging from about 50 kDa to about 60 kDa.

The nanoclay-filled-polymer 102 may have a $T_m$ (° C.) ranging from about 120° C. to about 200° C. (or about 130° C. to about 190° C., about 140° C. to about 180° C., about 150° C. to about 170° C.).

The thermoplastic polymer not filled with a nanoclay 108 may optionally comprise an additive. Typically, the additive would be present before addition of the thermoplastic polymers to the mixture. Therefore, in the polymer melt droplets and resultant nanoclay-filled-polymer particles 124/130, the additive is dispersed throughout the thermoplastic polymer. Accordingly, for clarity, this additive is referred to herein as an "internal additive." The internal additive may be blended with the thermoplastic polymer just prior to making the mixture or well in advance.

When describing component amounts in the compositions described herein (e.g., the mixture 112 and the nanoclay-filled-polymer particles 124), a weight percent based on the thermoplastic polymer not inclusive of the internal additive. For example, a composition comprising 1 wt % of emulsion stabilizer 106 by weight of 100 g of a thermoplastic polymer comprising 10 wt % internal additive and 90 wt % thermoplastic polymer is a composition comprising 0.9 g of emulsion stabilizer 106, 90 g of thermoplastic polymer, and 10 g of internal additive.

The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer not filled with a nanoclay 108. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

Suitable carrier fluids (e.g., carrier fluid 104) may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids (e.g., carrier fluid 104) may have a viscosity at 25° C. of about 10,000 cSt to about 60,000 cSt.

Examples of carrier fluids (e.g., carrier fluid 104) may include, but are not limited to, silicone oil, fluorinated silicone oils, perfluorinated silicone oils, polyethylene glycols, alkyl-terminal polyethylene glycols (e.g., $C_1$ to $C_4$ terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid 104 comprising a silicone oil and an alkyl-terminal polyethylene glycol may form a two-phase carrier fluid. In at least one embodiment, the carrier fluid 104 is polydimethylsiloxane (PDMS).

The carrier fluid 104 may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the nanoclay-filled-polymer 102, the thermoplastic polymers not filled with a nanoclay 108, and the carrier fluid 104 combined. The carrier fluid may be present at a weight ratio of the carrier fluid to a combination of the nanoclay-filled-polymer 102 and the thermoplastic polymer ranging from 50:50 to 90:10. For example, the carrier fluid may be present at a weight ratio of the carrier fluid to a combination of the nanoclay-filled-polymer 102 and the thermoplastic polymer of 70:30.

In some instances, the carrier fluid 104 may have a density of about 0.6 g/cm³ to about 1.5 g/cm³, and the thermoplastic polymer may have a density of about 0.7 g/cm³ to about 1.7 g/cm³, wherein the thermoplastic polymer may have a density similar, lower, or higher than the density of the carrier fluid 104.

The nanoclay should be sufficiently stable to not decompose at the processing temperatures. As described above, nonlimiting examples of nanoclay may include, but are not limited to, nanoclay Shelsite Na⁺, nanoclay Shelsite 15A, nanoclay Shelsite 20A, nanoclay Shelsite 30A, nanoclay Shelsite 93A, nanoclay NANOMER® PGV, nanoclay kaolin, nanoclay metakaolin, and the like, and any combination thereof.

The emulsion stabilizers (e.g., emulsion stabilizer 106) used in the methods and compositions of the present disclosure may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2$/g), AEROSIL® RX50 (about 40 nm average diameter silica nanoparticles having a hydrophobically modified surface and a BET surface area of 35±10 $m^2$/g), AEROSIL® 380 (silica nanoparticles having a hydrophilically modified surface and a BET surface area of 380±30 $m^2$/g), and the like, and any combination thereof.

Carbon black is another type of nanoparticle that may be present as an emulsion stabilizer in the composition's and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer (e.g., emulsion stabilizer 106) in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the nanoclay-filled-polymer 102. Alternatively, the mixture may comprise no (or be absent of) surfactant.

A weight ratio of nanoparticles to surfactant in the emulsion stabilizer 106 may be about 1:10 to about 10:1 (or about 1:10 to about 1:1, or about 1:5 to about 5:1, or about 1:1 to about 10:1).

The emulsion stabilizer 106 may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the nanoclay-filled-polymer 102 and the thermoplastic polymers not filled with a nanoclay 108 combined.

Relative to the combining 110 of FIG. 1, in some instances, the emulsion stabilizer 106 may first be dispersed in the carrier fluid 104, optionally with heating said dispersion, before adding the nanoclay-filled-polymer 102 and/or the thermoplastic polymers not filled with a nanoclay 108. In another nonlimiting example, the nanoclay-filled-polymer 102 and/or the thermoplastic polymers not filled with a nanoclay 108 may be heated to produce a polymer melt to which the carrier fluid 104 and emulsion stabilizer 106 are added together or in either order. In yet another nonlimiting example, the nanoclay-filled-polymer 102 and/or the thermoplastic polymers not filled with a nanoclay 108 along with carrier fluid 104 can be mixed at a temperature at or greater than the necessary melting point or softening temperature described herein and at a shear rate sufficient enough to disperse the polymer melt in the carrier fluid 104. Then, the emulsion stabilizer 106 can be added to form the mixture 112 and maintained at suitable process conditions for a set period of time.

Combining the nanoclay-filled-polymer 102, the thermoplastic polymers not filled with a nanoclay 108, the carrier fluid 104, and optionally the emulsion stabilizer 106 in any combination can occur in a mixing apparatus used for the processing and/or another suitable vessel. By way of nonlimiting example, the nanoclay-filled-polymer 102 and/or the thermoplastic polymers not filled with a nanoclay 108 may be heated to a temperature at or greater than the necessary melting point or softening temperature described herein in the mixing apparatus used for the processing, and the emulsion stabilizer 106 may be dispersed in the carrier fluid 104 in another vessel. Then, said dispersion may be added to the melt in the mixing apparatus used for the processing.

The mixing apparatuses used for the processing 114 to produce the melt emulsion 116 should be capable of maintaining the melt emulsion 116 at a temperature at or greater than the necessary melting point or softening temperature described herein and applying a shear rate sufficient to disperse the polymer melt in the carrier fluid 104 as droplets.

Examples of mixing apparatuses used for the processing 114 to produce the melt emulsion 116 may include, but are not limited to, extruders (e.g., continuous extruders, batch extruders, and the like), stirred reactors, blenders, reactors with inline homogenizer systems, and the like, and apparatuses derived therefrom.

The processing 114 and forming the melt emulsion 116 at suitable process conditions (e.g., temperature, shear rate, and the like) for a set period of time.

The temperature of the processing 114 and forming the melt emulsion 116 should be a temperature at or greater than the necessary melting point or softening temperature of the described herein and less than the decomposition temperature of any components (i.e., the nanoclay-filled-polymer 102, the thermoplastic polymers not filled with a nanoclay 108, carrier fluid 104, emulsion stabilizer 106) in the mixture 112. For example, the temperature of processing 114 and forming the melt emulsion 116 may be about 1° C. to about 250° C. (or about 10° C. to about 225° C., or about 15° C. to about 200° C.) greater than the melting point or softening temperature described herein provided the temperature of processing and forming the melt emulsion 116 is less than the decomposition temperature of any components (i.e., the nanoclay-filled-polymer 102, the thermoplastic polymers not filled with a nanoclay 108, carrier fluid 104, emulsion stabilizer 106) in the mixture 112.

The shear rate of processing 114 and forming the melt emulsion 116 should be sufficiently high to disperse the polymer melt in the carrier fluid 104 as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, the nanoclay-filled-polymer 102, the thermoplastic polymers not filled with a nanoclay 108, the carrier fluid composition 104, and the emulsion stabilizer composition 106.

The melt emulsion 116 may then be cooled 118. Cooling 118 can be slow (e.g., allowing the melt emulsion 116 to cool 118 under ambient conditions) to fast (e.g., quenching). For example, the rate of cooling 118 may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 116. In some instances, the shear applied during heating may be applied during cooling 118.

The cooled mixture resulting from cooling 118 the melt emulsion 116 may comprise solidified nanoclay-filled-polymer particles 124 and other components (e.g., the carrier fluid 104, excess emulsion stabilizer 106, and the like). The nanoclay-filled-polymer particles 124 may be dispersed in the carrier fluid 104 and/or settled in the carrier fluid 104.

The cooled mixture may then be treated to the separate nanoclay-filled-polymer particles 124 from the other components. Suitable treatments include, but are not limited to, washing, filtering, centrifuging, decanting, and the like, and any combination thereof.

Solvents used for washing the nanoclay-filled-polymer particles 124 should generally be (a) miscible with the carrier fluid 104 and (b) nonreactive (e.g., non-swelling and non-dissolving) with the nanoclay-filled-polymer 102 and/or the thermoplastic polymers not filled with a nanoclay 108. The choice of solvent will depend on, among other things, the compositions of the carrier fluid 104, the nanoclay-filled-polymer 102, and the thermoplastic polymers not filled with a nanoclay 108.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the nanoclay-filled-polymer particles 124 by drying using an appropriate method such as air-drying, heat-drying, reduced pressure drying, freeze drying, or a hybrid thereof. The heating may be performed preferably at a temperature lower than the softening point of the thermoplastic polymer of nanoclay-filled-polymer 102 and the softening point of the thermoplastic polymers not filled with a nanoclay 108, when included, (e.g., about 50° C. to about 150° C.).

Advantageously, carrier fluids (e.g., carrier fluid 104) and washing solvents of the systems and methods described herein can be recycled and reused. One skilled in the art will recognize any necessary cleaning of used carrier fluid 104 and solvent necessary in the recycling process.

The nanoclay-filled-polymer particles 124, after separation from the other components, may optionally be further purified. For example, to narrow the particle size distribution (or reduce the diameter span), the nanoclay-filled-polymer particles 124 can be passed through a sieve having a pore size of about 10 µm to about 250 µm (or about 10 µm to about 200 µm, or about 20 µm to about 150 µm, or about 30 µm to about 100 µm).

In another example purification technique, the nanoclay-filled-polymer particles 124 may be washed with water to remove surfactant while maintaining substantially all of the nanoparticles associated with the surface of the nanoclay-filled-polymer particles 124. In yet another example purification technique, the nanoclay-filled-polymer particles 124 may be blended with additives to achieve a desired final product. For clarity, because such additives are blended with the nanoclay-filled-polymer particles 124 described herein after the particles are solidified, such additives are referred to herein as "external additives." Examples of external additives include flow aids, other polymer particles, fillers, and the like, and any combination thereof.

In some instances, a surfactant used in making the nanoclay-filled-polymer particles 124 may be unwanted in downstream applications. Accordingly, yet another example purification technique may include at least substantial removal of the surfactant from the nanoclay-filled-polymer particles 124 (e.g., by washing and/or pyrolysis).

The nanoclay-filled-polymer particles 124 and/or purified nanoclay-filled-polymer particles 124 may be characterized by composition, physical structure, and the like.

As described above, the emulsion stabilizers (e.g., emulsion stabilizer 106) are at the interface between the polymer melt and the carrier fluid 104. As a result, when the mixture is cooled, the emulsion stabilizers (e.g., emulsion stabilizer 106) remain at, or in the vicinity of, said interface. Therefore, the structure of the nanoclay-filled-polymer particles 124 is, in general when emulsion stabilizers (e.g., emulsion stabilizer 106) are used, includes emulsion stabilizers (a) dispersed on an outer surface of the nanoclay-filled-polymer particles 124 and/or (b) embedded in an outer portion (e.g., outer 1 vol %) of the nanoclay-filled-polymer particles 124.

Further, where voids form inside the polymer melt droplets, emulsion stabilizers (e.g., emulsion stabilizer 106) should generally be at (and/or embedded in) the interface between the interior of the void and the nanoclay-filled-polymer 124 and/or thermoplastic polymer. The voids generally do not contain the nanoclay-filled-polymer 124 and/or thermoplastic polymer. Rather, the voids may contain, for example, carrier fluid 104, air, or be void. The nanoclay-filled-polymer particles 124 may comprise carrier fluid 104 at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the nanoclay-filled-polymer particles 124.

When the thermoplastic polymers not filled with a nanoclay are included, the nanoclay-filled-polymer and the thermoplastic polymers not filled with a nanoclay, combined, may be present in the nanoclay-filled-polymer particles at about 90 wt % to about 99.9 wt % (or about 90 wt % to about 95 wt %, or about 92 wt % to about 97 wt %, or about 95 wt % to about 99.9 wt %) of the nanoclay-filled-polymer particles. The weight ratio of the nanoclay-filled-polymer to the thermoplastic polymers not filled to a nanoclay, when included, may be about 10:90 to about 99:1 (or about 10:90 to about 50:50, or about 25:75 to about 75:25, or about 50:50 to about 99:1, or about 80:20 to about 99:1).

When included, the emulsion stabilizers (e.g., emulsion stabilizer 106) may be present in the nanoclay-filled-polymer particles 124 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the nanoclay-filled-polymer particles 124. When purified to at least substantially remove surfactant or another emulsion stabilizer, the emulsion stabilizers may be present in the nanoclay-filled-polymer particle 124/130 at less than 0.01 wt % (or 0 wt % to about 0.01 wt %, or 0 wt % to 0.001 wt %).

Upon forming nanoclay-filled-polymer particles 124 according to the disclosure herein using particulate emulsion stabilizers, at least a portion of the particulate emulsion stabilizers, such as silica nanoparticles, may be disposed as a coating upon the outer surface of the nanoclay-filled-polymer particle 124/130. At least a portion of the surfactant, if used, may be associated with the outer surface as well. The coating may be disposed substantially uniformly upon the outer surface.

As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the nanoclay-filled-polymer particles 124/130. When purified to at least substantially remove surfactant or another emulsion stabilizer, the emulsion stabilizers may be present in the nanoclay-filled-polymer particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the nanoclay-filled-polymer particles 124/130. The coverage of the emulsion stabilizers on an outer surface of the nanoclay-filled-polymer particles 124/130 may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the nanoclay-filled-polymer particles 124/130 (and coated nanoclay-filled-polymer particles, when produced). When purified to at least substantially remove surfactant or another emulsion stabilizer, the emulsion stabilizers may be present in the nanoclay-filled-polymer particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the nanoclay-filled-polymer particles 124/130. The coverage of the emulsion stabilizers on an outer surface of the nanoclay-filled-polymer particles may be determined using image analysis of the SEM micrographs.

The nanoclay-filled-polymer particles 124/130 of the present disclosure may include the nanoclay (or cumulative nanoclays if more than one is used) at about 0.05 wt % to about 20 wt % (or about 0.1 wt % to about 18 wt %, or about 1 wt % to about 15 wt %, or about 2 wt % to about 10 wt %) of the nanoclay-filled-polymer particles 124/130.

The nanoclay-filled-polymer particles 124/130 may comprise one or more nanoclays. For example, two or more different nanoclays may be incorporated to a thermoplastic polymer in the same reaction and then used as nanoclay-filled-polymer 102 in the methods and compositions described herein. In another example, two different nanoclay-filled-polymers may be produced and blended before (or during) the mixing process of the melt-emulsification process described herein.

The nanoclay-filled-polymer particles 124/130 may have a circularity of about 0.90 to about 1.0.

The nanoclay-filled-polymer particles 124/130 may have an average particle diameter (D50 based on volume) of about 20 μm to about 80 μm, such as about 25 μm to about 75 μm, such as about 30 μm to about 70 μm, such as about 40 μm to about 60 μm.

The nanoclay-filled-polymer particles 124/130 may have an average particle size of about 20 μm to about 80 μm, such as about 25 μm to about 75 μm, such as about 30 μm to about 70 μm, such as about 40 μm to about 60 μm.

The nanoclay-filled-polymer particles 124/130 may have a BET surface area of about 0.2 $m^2/g$ to about 100 $m^2/g$ (or about 0.2 $m^2/g$ to about 50 $m^2/g$, or about 25 $m^2/g$ to about 75 $m^2/g$, or about 50 $m^2/g$ to about 100 $m^2/g$).

The nanoclay-filled-polymer particles 124/130 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 50 μm, or about 25 μm to about 125 μm, or about 75 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The nanoclay-filled-polymer particles 124/130 may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferable, the nanoclay-filled-polymer particles 124/130 have a diameter span of about 0.2 to about 2.

In a first nonlimiting example, the nanoclay-filled-polymer particles 124/130 may have a D10 of about 0.1 μm to about 10 μm, a D50 of about 0.5 μm to about 25 μm, and a D90 of about 3 μm to about 50 μm, wherein D10<D50<D90. Said nanoclay-filled-polymer particles 124/130 may have a diameter span of about 0.2 to about 2.

In a second nonlimiting example, the nanoclay-filled-polymer particles 124/130 may have a D10 of about 5 μm to about 30 μm, a D50 of about 30 μm to about 70 μm, and a D90 of about 70 μm to about 120 μm, wherein D10<D50<D90. Said nanoclay-filled-polymer particles 124/130 may have a diameter span of about 1.0 to about 2.5.

In a third nonlimiting example, the nanoclay-filled-polymer particles 124/130 may have a D10 of about 25 μm to about 60 μm, a D50 of about 60 μm to about 110 μm, and a D90 of about 110 μm to about 175 μm, wherein D10<D50<D90. Said nanoclay-filled-polymer particles 124/130 may have a diameter span of about 0.6 to about 1.5.

In a fourth nonlimiting example, the nanoclay-filled-polymer particles 124/130 may have a D10 of about 75 μm to about 125 μm, a D50 of about 100 μm to about 200 μm, and a D90 of about 125 μm to about 300 μm, wherein D10<D50<D90. Said nanoclay-filled-polymer particles 124/130 may have a diameter span of about 0.2 to about 1.2.

In a fifth nonlimiting example, the nanoclay-filled-polymer particles 124/130 may have a D10 of about 1 μm to about 50 μm (or about 5 μm to about 30 μm, or about 1 μm to about 25 μm, or about 25 μm to about 50 μm), a D50 of about 20 μm to about 80 μm (or about 30 μm to about 80 μm), and a D90 of about 60 μm to about 300 μm (or about 70 μm to about 200 μm, or about 60 μm to about 150 μm, or about 150 μm to about 300 μm), wherein D10<D50<D90. The nanoclay-filled-polymer particles 124/130 may also have a diameter span of about 0.4 to about 3 (or about 0.6 to about 2, or about 0.4 to about 1.5, or about 1 to about 3).

The nanoclay-filled-polymer particles 124/130 may have a circularity of about 0.9 or greater (or about 0.90 to about 1.0, or about 0.93 to about 0.99, or about 0.95 to about 0.99, or about 0.97 to about 0.99, or about 0.98 to 1.0).

The nanoclay-filled-polymer particles 124/130 may have an angle of repose of about 25° to about 45° (or about 25° to about 35°, or about 30° to about 40°, or about 35° to about 45°). In some cases, the nanoclay-filled-polymer particles 124/130 may have an angle of repose of about 30° to about 35°.

The nanoclay-filled-polymer particles 124/130 may have a Hausner ratio of about 1.0 to about 1.5 (or about 1.0 to about 1.2, or about 1.1 to about 1.3, or about 1.2 to about 1.35, or about 1.3 to about 1.5).

The nanoclay-filled-polymer particles 124/130 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The nanoclay-filled-polymer particles 124/130 may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The nanoclay-filled-polymer particles 124/130 may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing and the composition and relative concentrations of the components (e.g., the nanoclay-filled-polymer 102, the thermoplastic polymer, the carrier fluid 104, excess emulsion stabilizer 106, and the like) different shapes of the structures that compose the nanoclay-filled-polymer particles 124/130 may be produced. Typically, the nanoclay-filled-polymer particles 124/130 comprise substantially spherical particles (having a circularity of about 0.97 or greater). However, other structures including disc and elongated structures may be observed in the nanoclay-filled-polymer particles 124/130. Therefore, the nanoclay-filled-polymer particles 124/130 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The nanoclay-filled-polymer particles 124/130 may have a sintering window that is within 10° C., preferably within 5° C., of the sintering window of the thermoplastic polymer of the nanoclay-filled-polymer.

The nanoclay-filled-polymer particles 124/130 may have a melting point ranging from about 150° C. to about 200° C. (or from about 155° C. to about 195° C., or from about 160° C. to about 190° C.).

The nanoclay-filled-polymer particles 124/130 may have a crystallization temperature ranging from about 120° C. to about 170° C. (or from about 125° C. to about 165° C., or from about 130° C. to about 160° C., such as from about 135° C. to about 155° C.).

The nanoclay-filled-polymer particles 124/130 may have a crystallinity ranging from about 10% to about 40% (or from about 10% to about 30%, or from about 20% to about 35%, or from about 30% to about 40%).

The nanoclay-filled-polymer particles 124/130 may have an MFI flow rate ranging from about 0.5 g/10 min to about 10 g/10 min (or from about 1 g/10 min to about 8 g/10 min, or from about 1.5 g/10 min to about 6 g/10 min, or from about 2 g/10 min to about 5 g/10 min).

The nanoclay-filled-polymer particles 124/130 may provide a dimensional accuracy of the SLS parts ranging from 0.1% to about 5% (or from about 0.5% to about 4.5%, or from about 1% to about 4%).

The nanoclay-filled-polymer particles 124/130 may have a tensile strength ranging from about 5 MPa to about 200 MPa (or from about 10 MPa to about 150 MPa).

Tensile strength and dimensional accuracy of the SLS parts of nanoclay-filled-polymer particles 124/130 of the present disclosure may be advantageously higher than that of typical thermoplastic polymer particle SLS parts with the same processing parameters.

The nanoclay-filled-polymer particles 124/130 may have a tensile modulus (as fiber) ranging from about 10 MPa to about 1000 MPa (or from about 15 MPa to about 800 MPa, or from about 20 MPa to about 600 MPa, or from about 30 MPa to about 500 MPa, or from about 50 MPa to about 600 MPa).

The nanoclay-filled-polymer particles 124/130 may have an ultimate strength ranging from about 50 MPa to about 500 MPa (or from about 60 MPa to about 450 MPa, or from about 70 MPa to about 400 MPa, or from about 80 MPa to about 350 MPa, or from about 90 MPa to about 300 MPa, or from about 100 MPa to about 250 MPa, or from about 50 MPa to about 150 MPa, or from about 80 MPa to about 120 MPa).

The nanoclay-filled-polymer particles 124/130 may have a flexural modulus ranging from about 40 MPa to about 2000 MPa (or from about 50 MPa to about 1500 MPa, or from about 60 MPa to about 1000 MPa).

The nanoclay-filled-polymer particles 124/130 may have an elongation at break ranging from about 10% to about 600% (or from about 50% to about 550%, or from about 100% to about 500%, or from about 150% to about 450%).

Applications of Nanoclay-Filled-Polymers

The nanoclay-filled-polymer described herein may be used to produce a variety of objects (or articles). The nanoclay-filled-polymers described herein may be used alone or in combination with other thermoplastic polymers and compatibilizers, if needed. Examples of thermoplastic polymer and compatibilizers are provided above.

Methods for producing objects include, but are not limited to, melt extrusion, injection molding, compression molding, melt spinning, melt emulsification, spray drying (e.g., to form particles), cryogenic milling (or cryogenic grinding), freeze drying polymer dispersions, precipitation of polymer dispersions, and the like, and any hybrid thereof.

Advantageously, the compositions and methods of the present disclosure provide highly uniformed and spherical particles suitable for 3-D printing and other manufacturing application, with better particle size distribution and improved flow properties when compared to polymer particles made by other methods like cryo-milling. Furthermore, when compared to polymer particles made without any nanoclay-filled-polymers, the compositions of the present disclosure may display increased mechanical properties (e.g., tensile strength, elongation at break), increased thermal stability, improved flame resistance, improved solvent resistance (or improved chemical resistance), and/or improved gas barrier properties (e.g., allowing less oxygen and other gases to permeate). Further, one or more of said properties may be achieved with little to no particle size classification (e.g., sieving) and/or low loading of nanoclays. Accordingly, the production of lighter weight articles by additive manufacturing where said articles have improved properties (e.g., flame retardance, chemical resistance, and/or less gas permeability) may be achieved.

Examples of articles that may be produced by such methods where the nanoclay-filled-polymers may be all or a portion of said articles include, but are not limited to, particles, films, packaging, toys, household goods, construction (building sections and structural panels), automotive parts (gas tanks, bumpers, interior and exterior panels), chemical processes (catalysts), pharmaceutical (as carriers of drugs and penetrants), aerospace/aircraft-related parts, flame retardant, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like. Said articles may have a higher degree of flame resistance, higher degree of chemical resistance, and/or less gas permeability (or a higher degree of gas barrier properties) as compared to articles produced without the inclusion of the nanoclays described herein.

By way of nonlimiting example, 3-D printing processes of the present disclosure may comprise: depositing particles comprising one or more nanoclay-filled-polymers of the present disclosure (where at least 90 wt % of the nanoclay is dispersed in the thermoplastic polymer as 1 layer to 10 layer particles) (and optionally one or more other thermoplastic polymers and/or one or more compatibilizers) upon a surface in a specified shape, and once deposited, heating at least a portion of the particles to promote consolidation thereof and form a consolidated body (object), such that the consolidated body has a void percentage of about 5% or less (e.g., 0% to about 5%, or about 0.5% to about 2%, or about 1% to about 3%, or about 2% to about 5%) after being consolidated. For example, heating and consolidation of the thermoplastic polymer particles may take place in a 3-D printing apparatus employing a laser, such that heating and consolidation take place by selective laser sintering.

By way of nonlimiting example, 3-D printing processes of the present disclosure may comprise: extruding a filament comprising one or more nanoclay-filled-polymers of the present disclosure (and optionally one or more other thermoplastic polymers and/or one or more compatibilizers) through an orifice, wherein the filament becomes a polymer melt upon extrusion; depositing the polymer melt as a first layer on a platform; cooling the layer; depositing an additional layer of the polymer melt on the first layer; cooling the additional layer; repeating depositing and cooling for at least one additional layer to produce a 3-D shape.

Yet another nonlimiting example is a method comprising: extruding a polymer melt comprising one or more nanoclay-filled-polymers of the present disclosure (and optionally one or more other thermoplastic polymers and/or one or more compatibilizers) through an orifice to produce a film, a fiber (or a filament), particles, pellets, or the like.

The particles comprising nanoclay-filled-polymers described herein may be useful in a variety of applications including 3-D printing. 3-D printing processes of the present disclosure may comprise: depositing nanoclay-filled-polymer particles of the present disclosure (e.g., particles comprising one or more nanoclay-filled-polymers and optionally one or more other thermoplastic polymers) upon a surface in a specified shape, and once deposited, heating at least a portion of the particles to promote consolidation thereof and form a consolidated body (object), such that the consolidated body has a void percentage of about 5% or less after being consolidated. For example, heating and consolidation of the thermoplastic polymer particles may take place in a 3-D printing apparatus employing a laser, such that heating and consolidation take place by selective laser sintering.

Example Embodiments

A first nonlimiting example embodiment of the present disclosure is a method comprising: mixing a mixture comprising: (a) nanoclay-filled-polymer composite comprising a nanoclay dispersed in a thermoplastic polymer (e.g., wherein at least 90 wt % of the nanoclay is dispersed in the thermoplastic polymer as 1 layer to 10 layer particles) (e.g., the thermoplastic polymer may be an elastomeric polymer) (e.g., the thermoplastic polymer may be a non-elastomeric polymer) (e.g., the thermoplastic polymer may be one or more of the thermoplastic polymers described herein including polyamides, polyurethanes, polyethylenes, polypropylenes, polyacetals, polycarbonates, PBT, PET, etc.), (b) a carrier fluid that is immiscible with the thermoplastic polymer of the nanoclay-filled-polymer composite, optionally (c) a thermoplastic polymer not filled with a nanoclay, and optionally (d) an emulsion stabilizer at a temperature at or greater than a melting point or softening temperature of the thermoplastic polymer of the nanoclay-filled-polymer and the thermoplastic polymer, when included, (e.g., and at a shear rate sufficiently high) to disperse the nanoclay-filled-polymer composite in the carrier fluid; cooling the mixture to below the melting point or softening temperature to form nanoclay-filled-polymer particles; and separating the nanoclay-filled-polymer particles from the carrier fluid. The first nonlimiting example embodiment may further include one or more of: Element 1: wherein the thermoplastic polymer is a thermoplastic polyurethane elastomer (TPU); Element 2: wherein the nanoclay comprises a quaternary ammonium compound; Element 3: wherein the nanoclay-filled-polymer composite is formed by melt mixing the nanoclay with the thermoplastic polymer for about 5 minutes to about 1 hour at about 125° C. to about 250° C.; Element 4: wherein the nanoclay-filled-polymer composite comprises about 80 wt % to about 99.9 wt % of the thermoplastic polymer, and about 0.05 wt % to about 20 wt % of the nanoclay, based on the total weight of the nanoclay-filled-polymer composite; Element 5: wherein the emulsion stabilizer is present and comprises plurality of nanoparticles comprises a plurality of oxide nanoparticles; Element 6: Element 5 and wherein the plurality of oxide nanoparticles comprises silica nanoparticles; Element 7: Element 6 and wherein the silica nanoparticle is present at a silica nanoparticle content ranging from about 0.01 wt % to about 10 wt %, based on the total weight of the nanoclay-filled-polymer composite; Element 8: wherein the carrier fluid is present at a weight ratio of the carrier fluid to the nanoclay-filled-polymer composite ranging from 50:50 to 90:10; Element 9: wherein the carrier fluid is polydimethylsiloxane (PDMS); Element 10: wherein the nanoclay is dispersed in the thermoplastic polymer via intercalation, flocculation, and/or exfoliation; Element 11: wherein the nanoclay-filled-polymer composite has an elongation at break ranging from about 200% to about 600%; Element 12: wherein the nanoclay-filled-polymer composite has a tensile strength ranging from about 10 MPa to about 30 MPa; Element 13: wherein the nanoclay-filled-polymer composite has a molecular weight ranging from about 20 kD to about 500 kD; Element 14: wherein the nanoclay-filled-polymer particles have a D50 ranging from about 20 μm to about 80 μm with a diameter span of about 2 or less; Element 15: wherein the nanoclay-filled-polymer particles have a D10 of about 0.5 μm to about 50 μm, a D50 of about 10 μm to about 200 μm, and a D90 of about 50 μm to about 300 μm, wherein D10<D50<D90; Element 16: wherein the nanoclay-filled-polymer particles have a diameter span of about 0.2 to about 10; Element 17: wherein the nanoclay-filled-polymer particles have a circularity of about 0.9 or greater (or about 0.90 to about 1.0); Element 18: wherein the nanoclay-filled-polymer particles have an angle of repose of about 25° to about 45°; Element 19: wherein the nanoclay-filled-polymer particles have a Hausner ratio of about 1.0 to about 1.5; Element 20: wherein the nanoclay-filled-polymer particles have a bulk density of about 0.2 g/cm$^3$ to about 0.8 g/cm$^3$; Element 21: wherein the nanoclay-filled-polymer particles have a BET surface area of about 0.2 m$^2$/g to about 100 m$^2$/g; Element 22: wherein the nanoclay-filled-polymer particles have a sintering window that is within 10° C. of the sintering window of the thermoplastic polymer of the nanoclay-filled-polymer; Element 23: wherein the nanoclay-filled-polymer particles have a melting point of about 150° C. to about 200° C.; Element 24: wherein the nanoclay-filled-polymer particles have a glass transition temperature of about −60° C. to about 100° C.; Element 25: wherein the nanoclay-filled-polymer particles have a crystallization temperature of about 120° C. to about 170° C.; Element 26: wherein the nanoclay-filled-polymer particles have a crystallinity of about 10% to about 40%; and Element 27: wherein the nanoclay-filled-polymer particles have an MFI flow rate of about 0.5 g/10 min to about 10 g/10 min. Examples of combinations include, but are not limited to: Element 1 in combination with one or more of Elements 2-27; Element 1 in combination with one or more of Elements 2-27; Element 2 in combination with one or more of Elements 3-27; Element 3 in combination with one or more of Elements 4-27; Element 4 in combination with one or more of Elements 5-27; Element 5 (optionally in combination with Element 5 or Elements 5 and 6) in combination with one or more of Elements 7-27; Element 6 in combination with one or more of Elements 2-27; Element 7 in combination with one or more of Elements 2-27; Element 8 in combination with one or more of Elements 2-27; Element 9 in combination with one or more of Elements 2-27; Element 10 in combination with one or more of Elements 2-27; Element 11 in combination with one or more of Elements 2-27; Element 12 in combination with one or more of Elements 2-27; Element 13 in combination with one or more of Elements 2-27; Element 14 in combination with one or more of Elements 2-27; Element 15 in combination with one or more of Elements 2-27; Element 16 in combination with one or more of Elements 2-27; Element 17 in combination with one or more of Elements 2-27; Element 18 in combination with one or more of Elements 2-27; Element 19 in combination with one or more of Elements 2-27; Element 20 in combination with one or more of Elements 2-27; Element 21 in combination with one or more of Elements 2-27; Element 22 in combination with one or more of Elements 2-27; Element 23 in combination with one or more of Elements 2-27; Element 24 in combination with one or more of Elements 2-27; and two or more of Elements 24-27 in combination.

A second nonlimiting example embodiment is a composition comprising: the nanoclay-filled-polymer particles produced by the method of the first nonlimiting example embodiment (e.g., wherein at least 90 wt % of the nanoclay is dispersed in the thermoplastic polymer as 1 layer to 10 layer particles).

A third nonlimiting example embodiment is a method comprising: depositing the nanoclay-filled-polymer particles of the second nonlimiting example embodiment optionally in combination with thermoplastic polymer particles (preferably of similar size and shape but may be porous or solid) upon a surface (e.g., in layers and/or in a specified shape), and once deposited, heating at least a portion of the nanoclay-filled-polymer particles to promote consolidation thereof and form a consolidated body (or object).

A fourth nonlimiting example embodiment is a composition comprising: nanoclay-filled-polymer particles comprising nanoclay-filled-polymer composite, wherein at least 90 wt % of the nanoclay is dispersed in the thermoplastic polymer as 1 layer to 10 layer particles. Said particles may optionally include an emulsion stabilizer at least partially coating the surface of the particles. Further, the nanoclay-filled-polymer particles may include one or more of Elements 1-27.

A fifth nonlimiting example embodiment is a method comprising: depositing the nanoclay-filled-polymer particles of the fourth nonlimiting example embodiment optionally in combination with thermoplastic polymer particles (preferably of similar size and shape but may be porous or solid) upon a surface (e.g., in layers and/or in a specified shape), and once deposited, heating at least a portion of the nanoclay-filled-polymer particles to promote consolidation thereof and form a consolidated body (or object).

CLAUSES

Clause 1. A method comprising: mixing a mixture comprising: (a) nanoclay-filled-polymer composite comprising a nanoclay dispersed in a thermoplastic polymer (e.g., the thermoplastic polymer may be an elastomeric polymer) (e.g., the thermoplastic polymer may be a non-elastomeric polymer) (e.g., the thermoplastic polymer may be one or more of the thermoplastic polymers described herein including polyamides, polyurethanes, polyethylenes, polypropylenes, polyacetals, polycarbonates, PBT, PET, etc.), (b) a carrier fluid that is immiscible with the thermoplastic polymer of the nanoclay-filled-polymer composite, optionally (c) a thermoplastic polymer not filled with a nanoclay, and optionally (d) an emulsion stabilizer at a temperature at or greater than a melting point or softening temperature of the thermoplastic polymer of the nanoclay-filled-polymer and the thermoplastic polymer, when included, (e.g., and at a shear rate sufficiently high) to disperse the nanoclay-filled-polymer composite in the carrier fluid; cooling the mixture to below the melting point or softening temperature to form nanoclay-filled-polymer particles; and separating the nanoclay-filled-polymer particles from the carrier fluid.

Clause 2. The method of Clause 1, wherein the thermoplastic polymer is a thermoplastic polyurethane elastomer (TPU).

Clause 3. The method of Clause 1, wherein the nanoclay comprises a quaternary ammonium compound.

Clause 4. The method of Clause 1, wherein the nanoclay-filled-polymer composite is formed by melt mixing the nanoclay with the thermoplastic polymer for about 5 minutes to about 1 hour at about 125° C. to about 250° C.

Clause 5. The method of Clause 1, wherein the nanoclay-filled-polymer composite comprises about 80 wt % to about 99.9 wt % of the thermoplastic polymer, and about 0.05 wt % to about 20 wt % of the nanoclay, based on the total weight of the nanoclay-filled-polymer composite.

Clause 6. The method of Clause 1, wherein the emulsion stabilizer is present and comprises plurality of nanoparticles comprises a plurality of oxide nanoparticles.

Clause 7. The method of Clause 6, wherein the plurality of oxide nanoparticles comprises silica nanoparticles.

Clause 8. The method of Clause 7, wherein the silica nanoparticle is present at a silica nanoparticle content ranging from about 0.01 wt % to about 10 wt %, based on the total weight of the nanoclay-filled-polymer composite.

Clause 9. The method of Clause 1, wherein the carrier fluid is present at a weight ratio of the carrier fluid to the nanoclay-filled-polymer composite ranging from 50:50 to 90:10.

Clause 10. The method of Clause 1, wherein the carrier fluid is polydimethylsiloxane (PDMS).

Clause 11. The method of Clause 1, wherein the nanoclay is dispersed in the thermoplastic polymer via intercalation, flocculation, and/or exfoliation.

Clause 12. The method of Clause 1, wherein the nanoclay-filled-polymer composite has an elongation at break (%) ranging from about 200% to about 600%.

Clause 13. The method of Clause 1, wherein the nanoclay-filled-polymer composite has a tensile strength (MPa) ranging from about 10 MPa to about 30 MPa.

Clause 14. The method of Clause 1, wherein the nanoclay-filled-polymer composite has a molecular weight (Mw, kD) ranging from about 20 kD to about 500 kD.

Clause 15. The method of Clause 1, wherein the nanoclay-filled-polymer particles have a D50 ranging from about 20 µm to about 80 µm with a diameter span of about 2 or less.

Clause 16. The method of Clause 1, wherein the nanoclay-filled-polymer particles have a D10 of about 0.5 µm to about 50 µm, a D50 of about 10 µm to about 200 µm, and a D90 of about 50 µm to about 300 µm, wherein D10<D50<D90.

Clause 17. The method of Clause 1, wherein the nanoclay-filled-polymer particles have a diameter span of about 0.2 to about 10.

Clause 18. The method of Clause 1, wherein the nanoclay-filled-polymer particles have a circularity of about 0.9 or greater (or about 0.90 to about 1.0).

Clause 19. The method of Clause 1, wherein the nanoclay-filled-polymer particles have an angle of repose of about 25° to about 45°.

Clause 20. The method of Clause 1, wherein the nanoclay-filled-polymer particles have a Hausner ratio of about 1.0 to about 1.5.

Clause 21. The method of Clause 1, wherein the nanoclay-filled-polymer particles have a bulk density of about 0.2 g/cm$^3$ to about 0.8 g/cm$^3$.

Clause 22. The method of Clause 1, wherein the nanoclay-filled-polymer particles have a BET surface area of about 0.2 m$^2$/g to about 100 m$^2$/g.

Clause 23. The method of Clause 1, wherein the nanoclay-filled-polymer particles have a sintering window that is within 10° C. of the sintering window of the thermoplastic polymer of the nanoclay-filled-polymer.

Clause 24. The method of Clause 1, wherein the nanoclay-filled-polymer particles have a melting point of about 150° C. to about 200° C.

Clause 25. The method of Clause 1, wherein the nanoclay-filled-polymer particles have a glass transition temperature of about −60° C. to about 100° C.

Clause 26. The method of Clause 1, wherein the nanoclay-filled-polymer particles have a crystallization temperature of about 120° C. to about 170° C.

Clause 27. The method of Clause 1, wherein the nanoclay-filled-polymer particles have a crystallinity of about 10% to about 40%.

Clause 28. The method of Clause 1, wherein the nanoclay-filled-polymer particles have an MFI flow rate of about 0.5 g/10 min to about 10 g/10 min.

Clause 28. The nanoclay-filled-polymer particles produced according to Clause 1.

Clause 29. A composition comprising: nanoclay-filled-polymer particles comprising nanoclay-filled-polymer composite wherein at least 90 wt % of the nanoclay is dispersed in the thermoplastic polymer (e.g., the thermoplastic polymer may be an elastomeric polymer) (e.g., the thermoplastic polymer may be a non-elastomeric polymer) (e.g., the thermoplastic polymer may be one or more of the thermoplastic polymers described herein including polyamides, polyurethanes, polyethylenes, polypropylenes, polyacetals, polycarbonates, PBT, PET, etc.) of the nanoclay-filled-polymer composite as 1 layer to 10 layer particles.

Clause 30. The composition of Clause 29, wherein the thermoplastic polymer is a thermoplastic polyurethane elastomer (TPU).

Clause 31. The composition of Clause 29, wherein the nanoclay comprises a quaternary ammonium compound.

Clause 32. The composition of Clause 29, wherein the nanoclay-filled-polymer composite comprises about 80 wt % to about 99.9 wt % of the thermoplastic polymer, and about 0.05 wt % to about 20 wt % of the nanoclay, based on the total weight of the nanoclay-filled-polymer composite.

Clause 33. The composition of Clause 29, wherein the nanoclay-filled-polymer composite has one or more of: an elongation at break (%) ranging from about 200% to about 600%; a tensile strength (MPa) ranging from about 10 MPa to about 30 MPa; a molecular weight (Mw, kD) ranging from about 20 kD to about 500 kD.

Clause 34. The composition of Clause 29, wherein the nanoclay-filled-polymer particles have a D10 of about 0.5 μm to about 50 μm, a D50 of about 10 μm to about 200 μm, and a D90 of about 50 μm to about 300 μm, wherein D10<D50<D90.

Clause 35. The composition of Clause 29, wherein the nanoclay-filled-polymer particles have a diameter span of about 0.2 to about 10.

Clause 36. The composition of Clause 29, wherein the nanoclay-filled-polymer particles have a circularity of about 0.9 or greater (or about 0.90 to about 1.0).

Clause 37. The composition of Clause 29, wherein the nanoclay-filled-polymer particles have an angle of repose of about 25° to about 45°.

Clause 38. The composition of Clause 29, wherein the nanoclay-filled-polymer particles have a Hausner ratio of about 1.0 to about 1.5.

Clause 39. The composition of Clause 29, wherein the nanoclay-filled-polymer particles have a bulk density of about 0.2 g/cm$^3$ to about 0.8 g/cm$^3$.

Clause 40. The composition of Clause 29, wherein the nanoclay-filled-polymer particles have a BET surface area of about 0.2 m$^2$/g to about 100 m$^2$/g.

Clause 41. The composition of Clause 29, wherein the nanoclay-filled-polymer particles have a sintering window that is within 10° C. of the sintering window of the thermoplastic polymer of the nanoclay-filled-polymer.

Clause 42. The composition of Clause 29, wherein the nanoclay-filled-polymer particles have a melting point of about 150° C. to about 200° C.

Clause 43. The composition of Clause 29, wherein the nanoclay-filled-polymer particles have a glass transition temperature of about −60° C. to about 100° C.

Clause 44. The composition of Clause 29, wherein the nanoclay-filled-polymer particles have a crystallization temperature of about 120° C. to about 170° C.

Clause 45. The composition of Clause 29, wherein the nanoclay-filled-polymer particles have a crystallinity of about 10% to about 40%.

Clause 46. The composition of Clause 29, wherein the nanoclay-filled-polymer particles have an MFI flow rate of about 0.5 g/10 min to about 10 g/10 min.

Clause 47. A method of selective laser sintering, the method comprising: depositing the nanoclay-filled-polymer particles of Clause 29 optionally in combination with other thermoplastic polymer particles onto a surface; and once deposited, exposing at least a portion of the nanoclay-filled-polymer particles to a laser to fuse the nanoclay-filled-polymer particles thereof and form a consolidated body by selective laser sintering.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the disclosure.

EXAMPLES

The thermoplastic polymers compositions comprising nanoclays and silica nanoparticles were formed to produce highly spherical polymer microspheres with increased mechanical and resistive properties.

The powder flow of the polyurethane microspheres was assessed using two techniques, (1) sieving (2) angle of repose measurement. The Sieved Yield (150 μm) was determined by measuring the percentage of the mass of the powder that passed through the sieve U.S.A. Standard Sieve ASTM E11 with opening of 150 μm. The angle of repose measurements were determined using a Hosokawa Micron Powder Characteristics Tester PT-R using ASTM D6393-14 "Standard Test Method for Bulk Solids" Characterized by Carr Indices."

Polymers were compounded by melt mixing in a HAAKE™ RHEOMIX twin screw extruder with high shear rotors, thus in order to disperse the nanoclay platelets throughout the polymer media. Several clays were tested in order to obtain the highest degree of dispersion. ELASTOLLAN® 1190A was purchased from BASF. Nanoclay Shelsite 20A was purchased from Nanoshel LLC. Nanoclay NANOMER® PGV (hydrophilic bentonite) was purchased from Sigma Aldrich. Nanoclay kaolin was purchased from Nanoshel LLC. Nanoclay metakaolin was purchased from Nanoshel LLC. The clay nanopowder (hydrated aluminum silicate) was purchased from Nanoshel LLC. AEROSIL® RX50 was purchased from Evonik.

Example A. Compounding of TPU and Nanoclay (TPU/Clay Compounds 1-3)

57 g of thermoplastic polyurethane (TPU) elastomer ELASTOLLAN® 1190A10 was premixed with an appropriate amount of nanoclay (e.g., 1.4 g (2.5 wt %), or 2.8 g (5 wt %)), and dried in vacuum oven at 60° C. for 12 hours before mixing. The HAAKE™ RHEOMIX twin screw mixer was set at temperatures of 200° C., 210° C., and 220° C., at minimum rotation (rpm). When set temperature was reached, the dried TPU/nanoclay mixture was then slowly fed into the mixer until complete addition of the mixture. The mixer was operated at 200 rpm as the polymer melted. The TPU/clay mixture was mixed for approximately 5 minutes after the temperature returned to set temperature. The compounded TPU/clay mixture was then discharged and cooled to room temperature. The solidified polymer composite was then shredded into manageable pellets with a 3Devo SHR3D IT shredder for further processing. Table 1 summarizes the conditions of various compounded samples (TPU/Clay Compounds 1-3) formed from the thermoplastic polyurethane (TPU) elastomer ELASTOLLAN® 1190A10.

TABLE 1

| TPU/Clay Compound | | Nanoclay | Nanoclay Loading (wt %) | Temperature (° C.) | FIG. |
|---|---|---|---|---|---|
| 1 | 1a | Shelsite 20A | 5 | 200 | 2A-2B |
|   | 1b | Shelsite 20A | 5 | 210 | 3A-3B |
|   | 1c | Shelsite 20A | 2.5 | 200 | 4A-4B |
| 2 | 2a | NANOMER ® PGV | 5 | 190 | 5A-5B |
|   | 2b | NANOMER ® PGV | 5 | 200 | 6A-6B |
| 3 | 3a | Metakaolin | 5 | 200 | 7A-7B |
|   | 3b | Metakaolin | 5 | 210 | 8A-8B |

FIGS. 2A-2B, 3A-3B, 4A-4B, 5A-5B, 6A-6B, 7A-7B, and 8A-8B are Scanning Electron Microscope (SEM) cross sectional images of various TPU/nanoclay composites (Samples 1a, 1b, 1c, 2a, 2b, 3a, and 3b). FIGS. 2A-2B, 3A-3B, and 4A-4B show that the clay nanoplatelets were dispersed throughout the TPU polymer matrix. The NANOMER® PGV clay (FIGS. 5A-5B and 6A-6B, Samples 2a and 2b) was well distributed, however the dispersion quality was found to be more reminiscent of a microcomposite. That is, the clay particles do not appear to be exfoliated but rather dispersed as larger clay particles often having a size of greater than 1 μm. Metakaolin nanoclay (FIGS. 7A-7B and 8A-8B, Samples 3a and 3b) resulted in a finer dispersion of the particles, yet some defects associated with Samples 3a and 3b composites were present, namely, large voids/bubbles and some clay agglomerates. When compared to Samples 2a, 2b, 3a, and 3b, the composites made from the organically modified Shelsite 20A (Samples 1a, 1b, and 1c) showed the best dispersion quality with very finely distributed platelets, very small amount of clay agglomerates and no voids.

Example B. Preparation Particles by Melt Emulsification. (Samples 4a-4c)

TPU/nanoclay compound (TPU/Clay Compound 1b) (16 g), 37 g PDMS oil (37 g, 60,000 cSt), and AEROSIL® RX50 (0.16 g, 1 wt %) were dried in vacuum oven to remove moisture and air. The HAAKE™ RHEOMIX twin screw mixer was set to 190° C. at minimum rotational speed. The TPU/nanoclay compound (Sample 1b), PDMS oil, and AEROSIL® RX50 were premixed, and the mixture was then added slowly to the HAAKE™ RHEOMIX twin screw mixer. Once all of the mixture was added the rotational speed was slowly increased to 200 rpm. After the internal temperature returned to 190° C., the mixture was mixed for 5 minutes at 200 rpm. After mixing for 5 minutes, the heated and mixing were stopped, and the slurry was discharged from the HAAKE™ RHEOMIX twin screw mixer into an aluminum pan. The slurry was transferred to a beaker and diluted with 100 mL of heptane, stirred for 30 minutes, and then filtered. The resulting particles were washed further with heptane (2×100 mL), then filtered, and dried in a vacuum oven.

Example C. Preparation Particles by Melt Emulsification. (Sample 5)

The procedure for Example B was repeated with the exception that TPU/Clay Compound 2b was used for the melt emulsification rather than TPU/Clay Compound 1b.

Figure 11A:
Figure 11B:
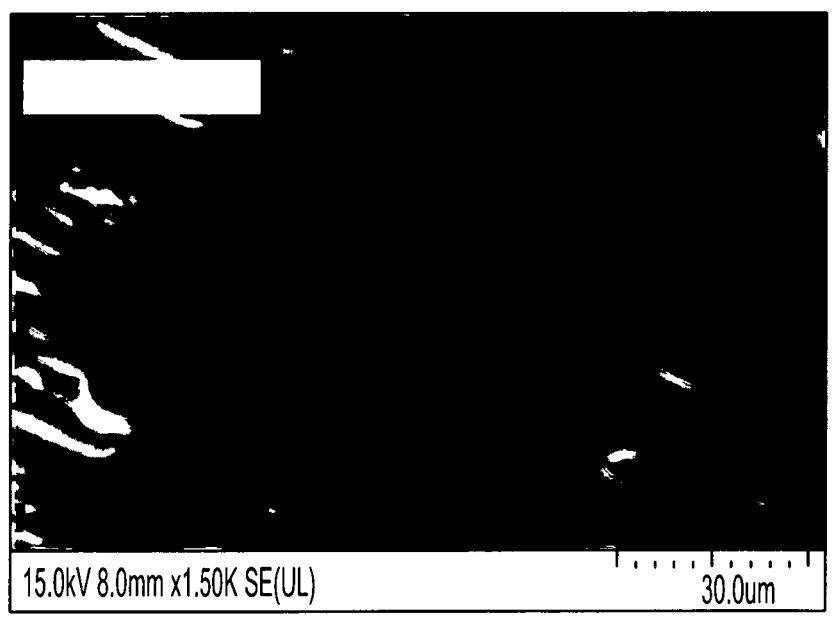
Figure 11C:
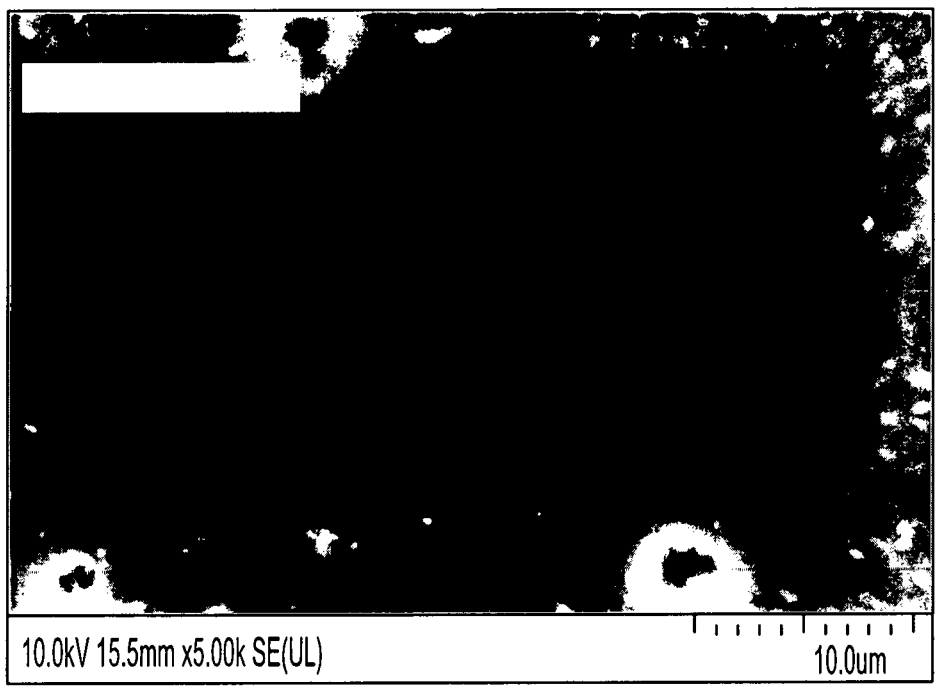

FIGS. 9A-9B, 10A-10B, and 11A-11C are SEM cross sectional images of various TPU/nanoclay compounded particles (Samples 4a, 4b, and 5, respectively). Said particles were prepared from TPU/nanoclay compounds, such as ELASTOLLAN® 1190A/NANOMER® PGV for Samples 4a-4b and ELASTOLLAN® 1190A/Shelsite 20A for Sample 5, via melt emulsification in a HAAKE™ RHEOMIX twin screw mixer. Particles made from TPU/NANOMER® PGV composite (e.g., Samples 4a-4b) resulted in large clay agglomerate and an overall reduction in dispersion quality. However, particles made from the TPU/Shelsite 20A composite ((Sample 5) retained a very fine dispersion of clay within the TPU matrix. Exfoliated clay platelets can be seen within the TPU particles (FIG. 11C). The dispersion quality with Shelsite 20A was much better than that with NANOMER® PGV as the space between the layers in the clay platelets increased with the addition of the quaternary ammonium salt. Advantageously, such increased spacing allowed monomers or polymers to penetrate the layers more easily, facilitating intercalation and exfoliation.

Table 2 illustrates the properties and conditions of the TPU/nanoclay composite particles (Examples B-C; Samples 4-5), which were prepared in a two-step process.

TABLE 2

| Sample | Nanoclay | Nanoclay Loading (wt %) | Temperature (° C.) | PDMS Oil Grade (cSt) | Silica Nanoparticle Additive (wt %) | FIGS. |
|---|---|---|---|---|---|---|
| 4 | 4a NANOMER ® PGV | 5 | 220 | 30,000 | 1 | 9A-9B |
|  | 4b NANOMER ® PGV | 5 | 220 | 60,000 | 1 | 10A-10B |
|  | 4c NANOMER ® PGV | 5 | 190 | 60,000 | 1 |  |
| 5 | 5 Shelsite 20A | 5 | 190 | 60,000 | 1 | 11A-11C |

Example D. Preparation Particles by Melt Emulsification. (Sample 6) (Comparative)

In a vacuum oven, 20 kg of TPU polymer pellets were dried at 80° C. overnight. Silica dispersion was prepared in PDMS oil as follows: 0.05 kg of silica was mixed with 30 kg of PDMS oil (10,000 cSt) in a 5 gallon plastic pail with an overhead mixer located in a KILO-LAB® B135 cylinder. Once all the dry powder was incorporated, the silica dispersion was loaded into clean PDMS feed tanks and left overnight to degas. Then, a LEISTRITZ™ 27 mm HP twin screw extruder (Model "ZSE-27") was loaded with the dried TPU polymer pellets, and the silica dispersion in PDMS feed tank, then heated to the target temperature. After the LEISTRITZ™ 27 mm HP twin screw extruder have reached the target temperature, the extruder screw was slowly increased to the target rotational speed (rpm). The TPU polymer was fed at a rate of 4 kg/h, while the PDMS was fed at a rate of 6 kg/h. The cooling conveyor belt was turned on with both air knife and water cooling. A time zero (t=0) was recorded when the TPU polymer and the PDMS feed started, and steady state prior to sample collection was recorded at least 20 minutes. The collection vessel was placed at the end of the conveyor belt to collect the cooled slurry of polymer particles in PDMS. The slurry comprising PDMS and TPU polymer was mixed with 40 kg of wash solvent (e.g., heptane) and charged into a clean filter "06-10". Three additional re-slurry washes, each with 40 kg of heptane, were conducted to remove PDMS from the polymer particles. Table 3 illustrates the properties and conditions of Sample 6. The polymer particles (Sample 6) were dried in a vacuum oven to remove residual solvent and prepared for 3D printing evaluation.

Example E. Preparation Particles by Melt Emulsification. (Sample 7) (Comparative)

The one-pot preparation of TPU/Shelsite 20A composite particles (Sample 7) was carried out as follow: ELASTOLLAN® 1190A (16 g), 37 g PDMS oil (37 g; 60,000 cSt), Shelsite 20A (nanoclay montmorillonite 20A) (0.8 g), and AEROSIL® RX50 (0.16 g, 1 wt %) were dried in vacuum oven to remove moisture and air. The HAAKE™ RHEOMIX twin screw mixer was set to 190° C. at a minimum rotational speed. The ELASTOLLAN® 1190A, PDMS oil, Shelsite 20A, and AEROSIL® RX50 were premixed. The mixture was then added slowly to the HAAKE™ RHEOMIX twin screw mixer. Once all of the mixture was added, the rotational speed was slowly increased to 200 rpm. After the internal temperature returned to 190° C., the mixture was mixed for 5 minutes at 200 rpm. After 5 minutes, the heated and mixing were stopped and the slurry was discharged from the HAAKE™ RHEOMIX twin screw mixer into an aluminum pan. The slurry was transferred to a beaker and diluted with 100 mL of heptane, stirred for 30 minutes, then filtered. The resulting particles were washed further with heptane (2×100 mL), filtered, and dried in a vacuum oven. Table 3 illustrates the properties and conditions of Sample 7.

Table 3 summarizes the conditions and properties of various polymer microspheres containing silica nanoparticles, clay nanoparticles or combinations thereof.

TABLE 3

|  | Comparative Example D | Comparative Example E | Example B | Example C |
|---|---|---|---|---|
| Sample | Sample 6 | Sample 7 | Sample 4c | Sample 5 |
| Polymer Type | TPU | TPU | TPU | TPU |
| Polymer Grade | ELASTOLLAN® 1190A | ELASTOLLAN® 1190A | ELASTOLLAN® 1190A | ELASTOLLAN® 1190A |
| Temperature (° C.) | 210 | 190 | 190 | 190 |
| PDMS Grade (cSt) | 10,000 | 60,000 | 60,000 | 60,000 |
| RPM | 450 | 200 | 200 | 200 |
| Silica Nanoparticle Additive (wt %) | 40 nm (0.7 wt %) | 40 nm (1 wt %) | 40 nm (1 wt %) | 40 nm 1 wt %) |
| Nanoclay (wt %) | N/A | Shelsite 20A (5 wt %) | NANOMER ® PGV (5 wt %) | Shelsite 20A (5 wt %) |
| Average Particle Size | 67.7 | N/A* | 38.8 | 44.0 |
| Span | 0.98 | N/A* | 1.129 | 1.715 |
| Angle of Repose (°) | 31.0 | N/A* | N/A* | 34.1 |

*Upon visual inspection, the results were similar to Example C (using 5 wt % Shelsite 20A), however, due to the limited quantity of samples obtained, measurements were not acquired.

Figure 12A:
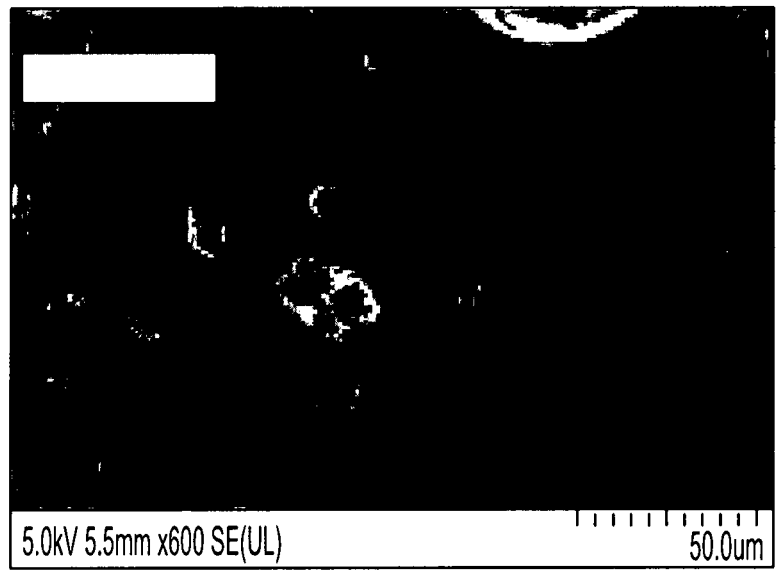
FIGS. 12A and 12B are a SEM cross sectional images of TPU/nanoclay composite particles prepared via a one-pot melt emulsification process.
Figure 12B:
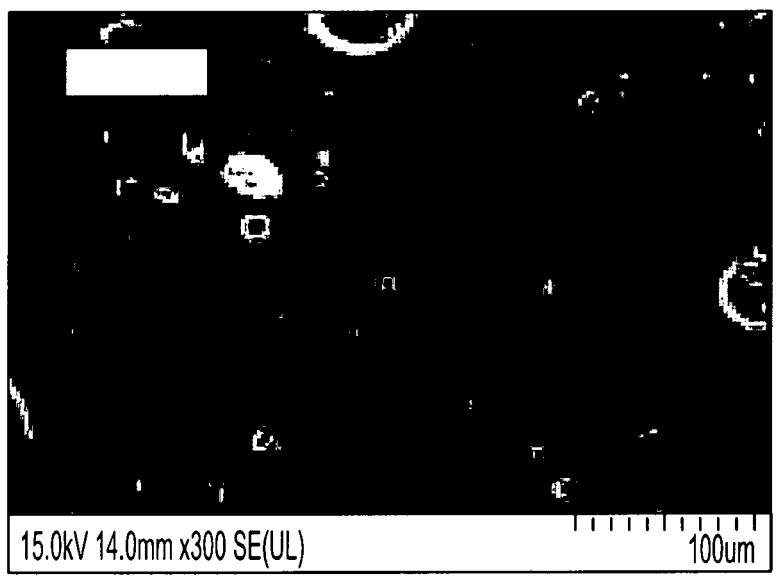

FIGS. 12A and 12B are a SEM cross sectional images of TPU/nanoclay composite particles (Sample 7) prepared via a one-pot melt emulsification process. Herein, a melt emulsification process was conducted in one step to form both the TPU/Shelsite 20A composites and its corresponding particles. As described above, the polymer, the nanoclay, the silica nanoparticles, and PDMS oil were all added to the HAAKE™ RHEOMIX twin screw mixer, and mixed for 10 minutes. As shown in FIGS. 12A and 12B, many irregularly shapes particles were observed, thus due to re-agglomeration, large voids, and agglomerated nanoclay within the polymer particles. In addition, the melt emulsification did not result in free flowing particles but rather coalesced into large chunks. Such observation shows the critical role of the formation of TPU polymer/nanoclay composite prior to mixing with the silica nanoparticles, and PDMS oil.

Example F. Selective Laser Sintering

Figure 13:
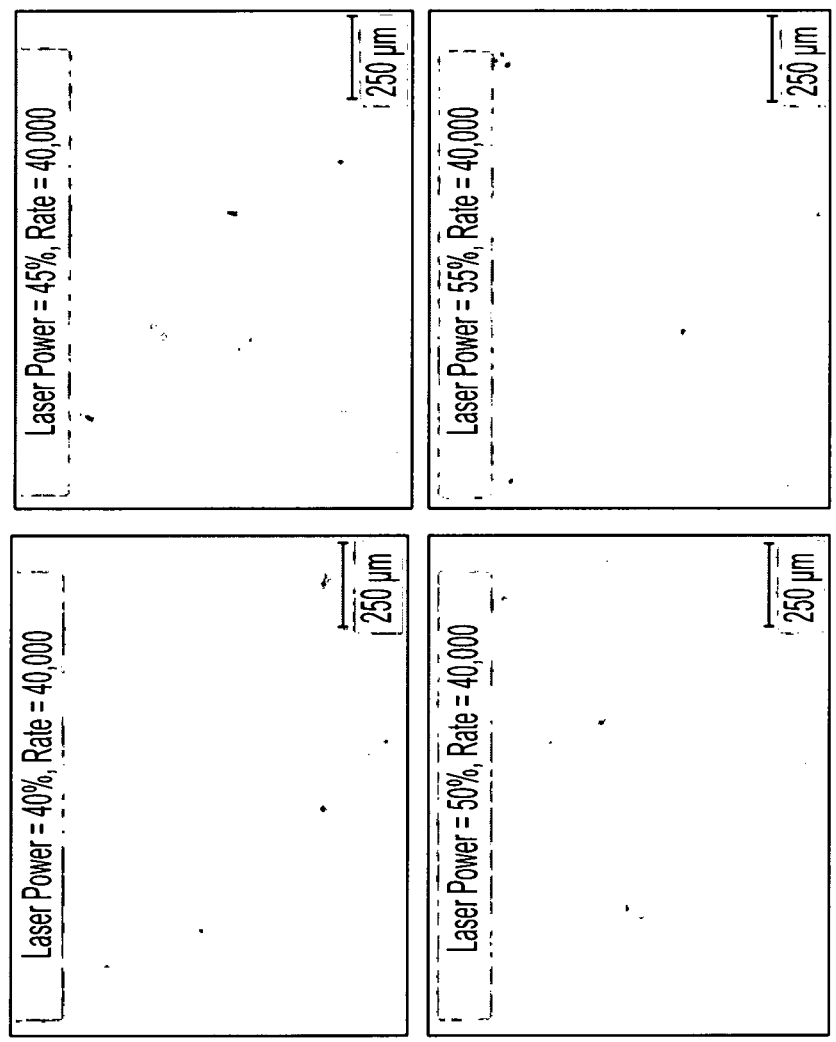
FIG. 13 is a selective laser sintering (SLS) of a TPU/nanoclay composite.

FIG. 13 is a selective laser sintering (SLS) of Sample 5 prepared from ELASTOLLAN® 1190A, 5 wt % Shelsite 20A) powder, and 1 wt % AEROSIL® RX50 made through melt emulsification via Haake mixer. Single layers of Sample 5 were sintered using a SNOWWHITE SLS printer (available from Sharebot). The powder of Sample 5 sintered well, starting at 35% laser power, which was comparable, if a little higher than TPU powders without clay. Essentially no voids in the singles layers were observed at all laser powers (35%-55%), with only 0.2% voids at 35%.

Example G. Injection Molding

Table 4 illustrates the mechanical testing of various injection molded (IM) samples (Sample 8a, Sample 8b, and Sample 8c). Shelsite 20A displayed the better dispersion properties within the TPU matrix (Samples 8a-8b) when compared to NANOMER® PGV and Metakaolin. Samples 8b and 8c were compounded in the HAAKE™ RHEOMIX twin screw mixer, and submitted for injection molding. The neat ELASTOLLAN® 1190A polymer (Sample 8a) was also mixed, and submitted for injection molding as a control.

Table 4 shows the mechanical properties of injection molded samples of neat ELASTOLLAN® 1190A polymer (Sample 8a), as well as the composite samples containing ELASTOLLAN® 1190A and Shelsite 20A (Sample 8b, and Sample 8c). Interestingly, Sample 8c (5 wt % Shelsite 20A) demonstrated a tensile strength increase of 11% and an elongation at break increase of 31% over the neat ELASTOLLAN® 1190A polymer (Sample 8a). Typically, the addition of a clay nanofiller results in a reduction of the elongation in a composite material. Herein, the Sample 8c had a higher tensile strength, when compared to Sample 8a, while maintaining its rubbery nature.

TABLE 4

| Sample | Sample 8a | Sample 8b | Sample 8c |
| --- | --- | --- | --- |
| Processing | IM | IM | IM |
| TPU | ELASTOLLAN® 1190A | ELASTOLLAN® 1190A | ELASTOLLAN® 1190A |
| Nanoclay (wt %) | N/A | Shelsite 20A (2.5 wt %) | Shelsite 20A (5 wt %) |
| Young's Modulus (MPa) | 33 | 35 | 30.5 |
| Tensile (MPa) | 15.5 | 12.3 | 17.2 |
| Elongation at Break (%) | 321 | 274 | 421 |
| Flexural Modulus (MPa) | 78 | 61 | 62 |
| Flexural Strength (MPa) | 6 | 5 | 5.1 |
| Hardness (Shore A) | 88 | 85 | 88 |
| Molecular Weight (Mw, kD) | 65.7 | 58.9 | 59.6 |

Table 5 summarizes the melting temperature of the neat ELASTOLLAN® 1190A polymer (Sample 8a) and the TPU/Shelsite 20A composites (Sample 8b and Sample 8c). As indicated in Table 5, an increase in the melting temperature of the TPU polymer was obtained after the addition of clay.

TABLE 5

| Sample | $T_m$ (° C.) |
| --- | --- |
| Sample 8a | 153.9 |
| Sample 8b | 168.9 |
| Sample 8c | 164.7 |

Figure 14:
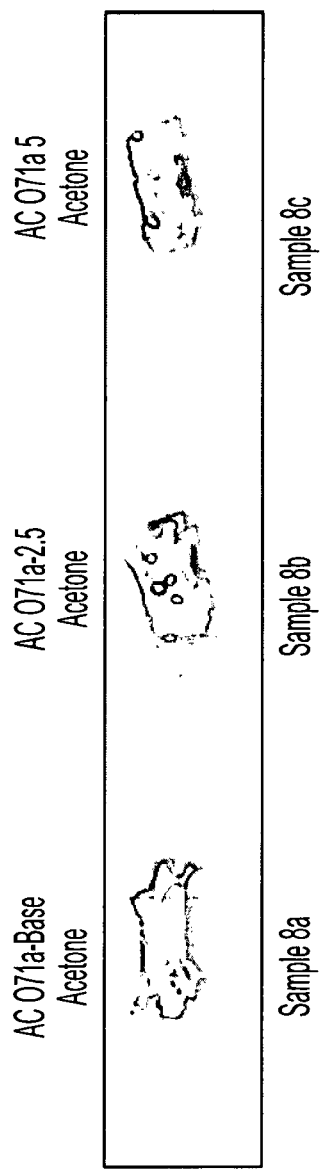
FIG. 14 is a representative picture of various injection molded parts of TPU and TPU/nanoclay composites subjected to chemical treatments.

The injection molded parts were subjected to acetone (Table 6, FIG. 14). The injection molded parts were weighed and then submersed in a bottle with 20 mL of acetone, at room temperature. Table 6 shows that the base polymer exhibited a slightly higher degree of swelling than Sample 8c, which contains 5 wt % Shelsite 20A. In addition to reduced swelling, the 5 wt % Shelsite 20A sample showed a lower degree of solubility as well, with only 6.6 wt % of the sample being lost to acetone as opposed to the base polymer which resulted in a loss of 10 wt %.

Table 6 summarizes the solvent resistance capability of the neat ELASTOLLAN® 1190A polymer (Sample 8a) and the TPU/Shelsite 20A composites (Sample 8b and Sample 8c).

TABLE 6

| Sample | Sample 8a | Sample 8b | Sample 8c |
| --- | --- | --- | --- |
| Processing | IM | IM | IM |
| TPU | ELASTOLLAN® 1190A | ELASTOLLAN® 1190A | ELASTOLLAN® 1190A |
| Nanoclay (wt %) | N/A | Shelsite 20A (2.5 wt %) | Shelsite 20A (5 wt %) |

TABLE 6-continued

| Sample | Sample 8a | Sample 8b | Sample 8c |
|---|---|---|---|
| Solvent | Acetone | Acetone | Acetone |
| Temperature | Room temperature | Room temperature | Room temperature |
| Sample Mass (T = 0) (g) | 1.202 | 1.296 | 1.315 |
| Mass ($T_1$ = 20 hrs) (g) | 2.122 | 2.153 | 2.24 |
| % Mass Change ($T_1$) | +92 | +85.7 | +90.9 |
| Mass Fully Dried (g) | 1.102 | 1.15 | 1.249 |
| % Change Dried Sample | −10 | −14.6 | −6.6 |

FIG. 14 is a representative picture of each injection molded parts described above, after being subjected to acetone. Sample 8 present larger amount of delamination and cracking when compared to Sample 8b and Sample 8c. Sample 8b and Sample 8c presented minor cracking and a small amount of delamination, yet the size and shape was largely retained when compared to Sample 8.

Example H. (Prophetic)

Nylon 6 and Cloisite 30B clay may be compounded in a Barbender Mixer at about 250° C. at about 30 rpm to yield a nanoclay-filled-nylon where the clay may be intercalated with nylon. Said nanoclay-filled-nylon may be used to make particles by melt emulsification methods described herein (e.g., by methods described in Examples B-C or at other temperatures suitable for the nylon).

Example I. (Prophetic)

Nylon 66 and sodium montmorillonite (Na-MMT) clay may be compounded in a twin screw extruder with zonal and/or head temperatures ranging from about 265° C. to about 270° C. to yield a nanoclay-filled-nylon. Said nanoclay-filled-nylon may be used to make particles by melt emulsification methods described herein (e.g., by methods described in Examples B-C or at other temperatures suitable for the nylon).

Example J. (Prophetic)

The curing agents of an epoxy and sodium montmorillonite (Na-MMT) clay may be sonicated or otherwise mixed. The epoxy prepolymer may then be added to the curing agents and Na-MMT and mixed at about 80° C. for about 15 minutes. The resultant mixture may then be allowed to cure (e.g., in a mold) to yield a nanoclay-filled-epoxy where the nanoclay may be exfoliated in the epoxy. Said nanoclay-filled-epoxy may be used to make particles by melt emulsification methods described herein (e.g., by methods described in Examples B-C or at other temperatures suitable for the epoxy).

Example K. (Prophetic)

A polyamide and Na-MMT clay may be compounded in a twin screw extruder with zonal and/or head temperatures ranging from about 265° C. to about 270° C. to yield a nanoclay-filled-polyamide where the nanoclay may be exfoliated in the polyamide. Said nanoclay-filled-polyamide may be used to make particles by melt emulsification methods described herein (e.g., by methods described in Examples B-C or at other temperatures suitable for the polyamide).

Example L. (Prophetic)

A montmorillonite (MMT) clay may be dispersed in an aqueous solution comprising sodium dodecyl sulfate via sonication or other mixing method. A polypropylene latex may be added to the MMT suspended in the aqueous solution of sodium dodecyl sulfate. The resultant mixture may be freeze dried to yield a nanoclay-filled-polypropylene where the nanoclay may be exfoliated in the polypropylene. Said nanoclay-filled-polypropylene may be used to make particles by melt emulsification methods described herein (e.g., by methods described in Examples B-C or at other temperatures suitable for the polypropylene).

Example M. (Prophetic)

A MMT clay may be dry blended with polyvinylchloride. The resultant dry blended mixture may be melt mixed at about 150° C. for about 5 minutes to yield a nanoclay-filled-polyvinylchloride where the nanoclay may be exfoliated in the polyvinylchloride. Said nanoclay-filled-polyvinylchloride may be used to make particles by melt emulsification methods described herein (e.g., by methods described in Examples B-C or at other temperatures suitable for the polyvinylchloride).

Example N. (Prophetic)

Poly(methyl methacrylate) and Na-MMT and/or Cloisite 20A clays may be compounded in a Barbender Mixer at about 180° C. at about 50 rpm to yield a nanoclay-filled-poly(methyl methacrylate) where the clay may be intercalated with poly(methyl methacrylate). Said nanoclay-filled-poly(methyl methacrylate) may be used to make particles by melt emulsification methods described herein (e.g., by methods described in Examples B-C or at other temperatures suitable for the poly(methyl methacrylate)).

Example O. (Prophetic)

Maleic anhydride modified polypropylene and MMT clay may be compounded in a Barbender Plasticorder at about 140° C. to about 165° C. to yield a nanoclay-filled-maleic anhydride modified polypropylene where the clay may be exfoliated with maleic anhydride modified polypropylene. Said nanoclay-filled-maleic anhydride modified polypropylene may be used to make particles by melt emulsification methods described herein (e.g., by methods described in Examples B-C or at other temperatures suitable for the maleic anhydride modified polypropylene).

Example P. (Prophetic)

Natural rubber and organo-MMT clay (e.g., Cloisite 10A, 15A, 25A, 30B, 93B, and combinations thereof) may be mixed in a twin-roll mill. The resultant mixture may be mixed with isoprene at room temperature and then allowed to cure to yield a nanoclay-filled-natural rubber where the clay may be intercalated with natural rubber. Said nanoclay-filled-natural rubber may be used to make particles by melt emulsification methods described herein (e.g., by methods described in Examples B-C or at other temperatures suitable for the natural rubber).

Example Q. (Prophetic)

Polystyrene and organo-MMT clay may be mixed in a twin-roll mill at about 170° C. to yield a nanoclay-filled-polystyrene where the clay may be intercalated with polystyrene. Said nanoclay-filled-polystyrene may be used to make particles by melt emulsification methods described herein (e.g., by methods described in Examples B-C or at other temperatures suitable for the polystyrene).

Example R. (Prophetic)

Acrylonitrile butadiene styrene (ABS) and organo-MMT clay may be mixed in a twin-roll mill at about 190° C. to yield a nanoclay-filled-ABS where the clay may be intercalated with ABS. Said nanoclay-filled-ABS may be used to make particles by melt emulsification methods described herein (e.g., by methods described in Examples B-C or at other temperatures suitable for the ABS).

Example R. (Prophetic)

Polyamide 12 and organo-MMT clay may be mixed in an extruder at about 225° C. to yield a nanoclay-filled-polyamide where the clay may be intercalated with polyamide 12. Said nanoclay-filled-polyamide may be used to make particles by melt emulsification methods described herein (e.g., by methods described in Examples B-C or at other temperatures suitable for the polyamide 12).

Therefore, the present disclosure is well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The present disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:
1. A method comprising:
   providing a mixture comprising:
      (a) a nanoclay-filled-polymer composite comprising a nanoclay dispersed in a thermoplastic polymer,
      (b) a carrier fluid that is immiscible with the thermoplastic polymer of the nanoclay-filled-polymer composite,
      (c) optionally, a thermoplastic polymer not filled with a nanoclay, and
      (d) optionally, an emulsion stabilizer;
   shearing the mixture at a temperature at or greater than a melting point or softening temperature of the thermoplastic polymer of the nanoclay-filled-polymer composite and the thermoplastic polymer not filled with the nanoclay, when included, to disperse the nanoclay-filled-polymer composite as droplets in the carrier fluid;
   cooling the mixture to below the melting point or softening temperature to form nanoclay-filled-polymer particles containing exfoliated clay platelets dispersed in the thermoplastic polymer; and
   separating the nanoclay-filled-polymer particles from the carrier fluid.

2. The method of claim 1, wherein at least 90 wt % of the nanoclay is dispersed in the thermoplastic polymer as the exfoliated clay platelets.

3. The method of claim 1, wherein the nanoclay comprises a quaternary ammonium compound.

4. The method of claim 1, wherein the nanoclay-filled-polymer composite is formed by melt mixing the nanoclay with the thermoplastic polymer for about 5 minutes to about 1 hour at about 125° C. to about 250° C.

5. The method of claim 1, wherein the nanoclay-filled-polymer composite comprises about 80 wt % to about 99.9 wt % of the thermoplastic polymer, and about 0.05 wt % to about 20 wt % of the nanoclay, based on the total weight of the nanoclay-filled-polymer composite.

6. The method of claim 1, wherein the emulsion stabilizer is present and comprises a plurality of nanoparticles, the plurality of nanoparticles comprising a plurality of oxide nanoparticles.

7. The method of claim 6, wherein the plurality of oxide nanoparticles comprises silica nanoparticles.

8. The method of claim 7, wherein the silica nanoparticles are present at a silica nanoparticle content ranging from about 0.01 wt % to about 10 wt %, based on a total weight of the nanoclay-filled-polymer composite.

9. The method of claim 1, wherein the carrier fluid is present at a weight ratio with respect to the nanoclay-filled-polymer composite ranging from 50:50 to 90:10.

10. The method of claim 1, wherein the carrier fluid is polydimethylsiloxane.

11. The method of claim 1, wherein the nanoclay-filled-polymer composite has an elongation at break ranging from about 200% to about 600%.

12. The method of claim 1, wherein the nanoclay-filled-polymer composite has a tensile strength ranging from about 10 MPa to about 30 MPa.

13. The method of claim 1, wherein the nanoclay-filled-polymer composite has a molecular weight ranging from about 20 kD to about 500 kD.

14. The method of claim 1, wherein the nanoclay-filled-polymer particles have a D50 ranging from about 20 μm to about 80 μm with a diameter span of about 2 or less.

15. The method of claim 1, wherein the thermoplastic polymer of the nanoclay-filled-polymer composite comprises a polyamide, a polyolefin, and/or a polyurethane.

16. The method of claim 15, wherein the thermoplastic polymer not filled with the nanoclay comprises a polyamide, a polyolefin, and/or a polyurethane.

* * * * *